United States Patent [19]
Lessin et al.

[11] Patent Number: 4,868,376
[45] Date of Patent: Sep. 19, 1989

[54] INTELLIGENT PORTABLE INTERACTIVE PERSONAL DATA SYSTEM

[75] Inventors: Arlen R. Lessin, New York; Frank M. Gruppuso, Commack; Shelley A. Harrison, Dix Hills, all of N.Y.

[73] Assignee: SmartCard International Inc., New York, N.Y.

[21] Appl. No.: 51,110

[22] Filed: May 15, 1987

[51] Int. Cl.4 ............................................. G06K 19/06
[52] U.S. Cl. .................................. 235/492; 235/487; 235/380
[58] Field of Search ............... 235/492, 493, 487, 379, 235/380, 382, 382.5; 340/825.31, 825.32, 825.33, 825.34

[56] References Cited

U.S. PATENT DOCUMENTS

| | | | |
|---|---|---|---|
| 3,971,916 | 7/1976 | Moreno | 364/200 |
| 4,211,919 | 7/1980 | Ugon | 235/488 |
| 4,298,793 | 11/1981 | Melis et al. | 235/487 |
| 4,575,621 | 3/1986 | Dreifus | 235/380 |
| 4,587,409 | 5/1986 | Nishimura et al. | 235/380 |
| 4,614,861 | 9/1986 | Pavlov et al. | 235/380 |
| 4,677,657 | 6/1987 | Nagata et al. | 235/380 X |
| 4,697,072 | 9/1987 | Kawana | 235/380 |
| 4,701,601 | 10/1987 | Francini et al. | 235/492 X |
| 4,742,215 | 5/1988 | Daughters et al. | 235/487 |
| 4,752,678 | 6/1988 | Rikuna | 235/380 |

*Primary Examiner*—Philip H. Leung
*Attorney, Agent, or Firm*—Pennie & Edmonds

[57] ABSTRACT

An intelligent portable interactive personal data system is disclosed. A microprocessor with memory is contained with a transaction card-shaped housing. An alphanumeric keypad and alphanumeric display is located on a surface of the housing. At least one port within the housing is provided for the input and output of information. An operating system is stored in the memory to control the operation of the system through the microprocessor. The operating system provides a means for generating a plurality of messages on the display that prompts the user during the operation of the system.

33 Claims, 27 Drawing Sheets

4,868,376

INTELLIGENT PORTABLE INTERACTIVE PERSONAL DATA SYSTEM

FIELD OF THE INVENTION

This invention relates to transaction cards and, in particular, to a card containing a microprocessor, memories and interfacing capabilities which is described herein as an "intelligent transaction card".

BACKGROUND OF THE INVENTION

The use of transaction cards has increased tremendously over the past couple of years. These cards are used for a variety of purposes, including, credit cards, security-identification cards to control access to secured areas and devices, and bank cards for use in automatic teller machines.

Typically, the transaction card has information encoded on the card to identify the cardholder. This information may be magnetically, electronically or optically encoded. For example, a financial transaction card such as a credit or debit card has the necessary account information stored in a magnetic strip on the back of the card.

As the use of transaction cards has increased, it has become desirable to increase the functionality in the cards by encoding additional information on the card, by making it possible to change such information, and by providing processing and/or input/output capabilities. For example, Moreno, U.S. Pat. No. 3,971,916 describes the use of a semiconductor memory for the storage of information. Ugon, U.S. Pat. No. 4,211,919 describes the addition of a microprocessor to the card to control the input and output of information from the memory. Dreifus, U.S. Pat. No. 4,575,621 also describes a microprocessor based system which can operate in conjunction with a terminal or operate in a stand-alone mode during which it monitors itself for abnormal conditions which may be caused by component failure or physical intrusion of the card.

These microprocessor based transaction cards are often referred to as "smart cards". However, these cards are still limited in that they are constructed to perform a predetermined function. Some smart cards prohibit any modification of the card once the card is fully assembled. The microprocessor in Ugon controls the input and output of information from memory. In Dreifus, a ROM stores system program information which cannot be changed. Instead the system information stored in ROM may be modified by information stored in RAM. However, the original programmed function of the card remains and is never permanently changed or removed from the card.

In addition, the above described cards are typically operated in conjunction with a terminal device rather than independently of any such device. Finally, these cards were not designed to be "user friendly". With prior art transaction cards, the cardholder has to memorize the proper procedure to operate the card.

SUMMARY OF THE INVENTION

In the present invention, a general-purpose reprogrammable intelligent card is disclosed. The card includes an alphanumeric keypad, an alphanumeric display and one or more input/output ports controlled by a microprocessor and programs stored in a memory associated with the microprocessor. The microprocessor is provided with an operating system and may be programmed or reprogrammed for a specific application or for a variety of applications.

The system can be used in conjunction with a terminal device or independently in a stand-alone mode. The card is menu-driven and user friendly. It prompts the cardholder on proper operating procedure and displays clear, concise messages that the cardholder can understand. Security features may be programmed into the card to prevent the use of the card by unauthorized persons.

BRIEF DESCRIPTION OF THE DRAWINGS

The objects, features and advantages of the transaction card of the present invention will be apparent from the following detailed description of the preferred embodiment in which.

DESCRIPTION OF THE PREFERRED EMBODIMENT

Figure 1A:
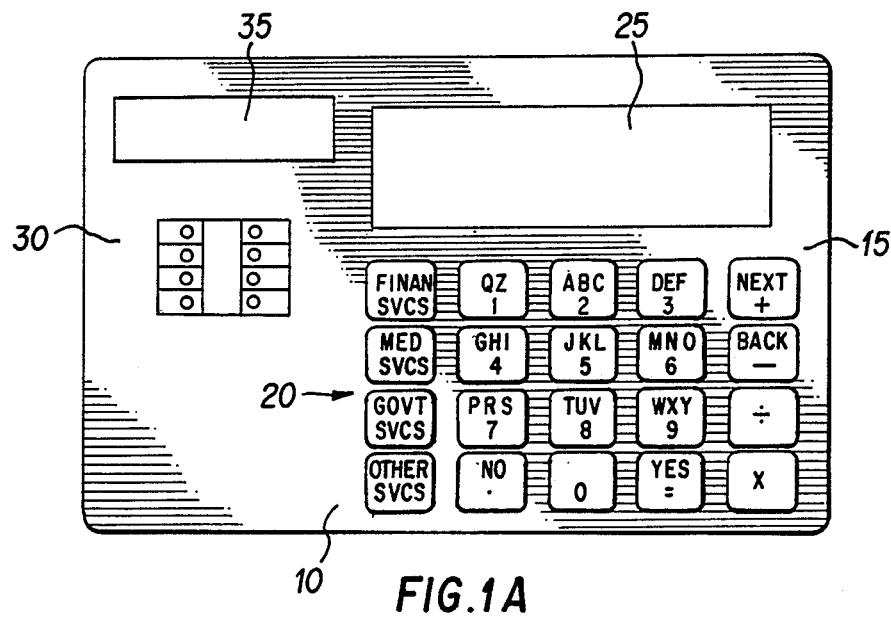
FIGS. 1A and 1B illustrate the front and back views of one embodiment of the transaction card of the present invention.
Figure 1B:
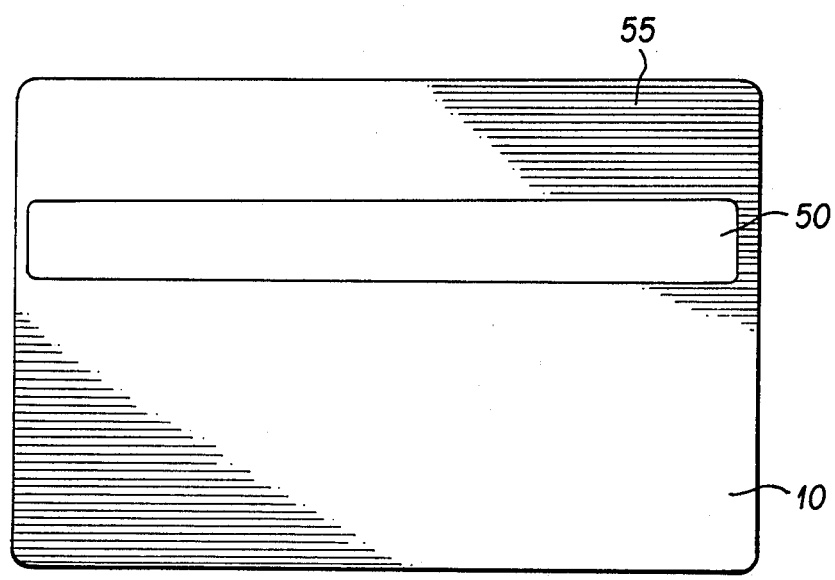

FIGS. 1A and 1B are an illustration of one embodiment of the present invention, a general purpose programmable intelligent transaction card (ITC) 10. Advantageously, at least the length and width dimensions of the card are approximately the same as the 3.375"×2.125" (86 mm×55 mm) dimensions of conventional transaction cards. A multifunction alphanumeric keypad 20 and liquid crystal display 25 are located on a front surface 15 of the card. A plurality of electrical and/or optical contacts 30 provide a means for the input and output of information from the ITC. Power for the card may be supplied by a battery (not shown) mounted in the card or by an external source connected to the card through some of contacts 30. Advantageously, an electromagnetic energy receiver such as a solar cell 35 may be used to supply power to the ITC. In addition a magnetic strip 50 may be provided on back surface 55 of the card through which the ITC may interface with existing magnetic strip-based transaction card systems. Further details of the circuitry of the ITC are set forth in conjunction with FIGS. 19–21.

Figure 2A:
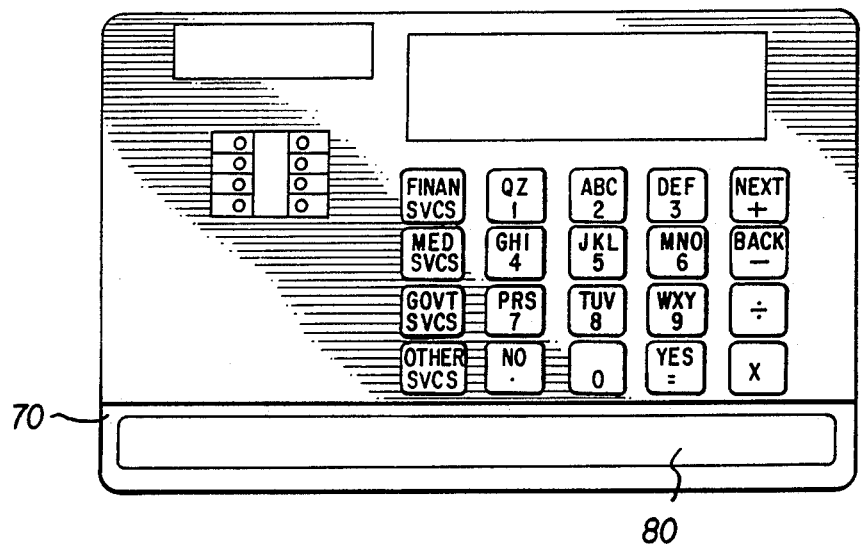
FIGS. 2A and 2B illustrate the front and side views of another embodiment of the transaction card of the present invention.
Figure 2B:
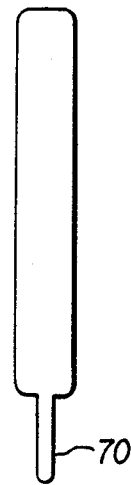

As illustrated in FIGS. 2A and 2B, if the transaction card of the present invention is thicker than the 30 to 65 mil (0.762 to 1.651 mm) thickness of a conventional transaction card, a bottom portion 70 having a width sufficiently narrow to fit into conventional magnetic card readers is provided with a magnetic strip 80 attached to a surface thereof.

Although the ITC card may be tailored for one specific application or type of transaction, the card is designed with an operating system which provides sufficient intelligence and flexibility to be used in conjunction with a variety of application programs. For example, the same ITC card may be programmed to keep track of the cardholder's banking activities, to charge a purchase, or to identify the cardholder in order to gain access into a secured area. It may also be used to store information such as medical histories, travel records, addresses and telephone numbers and appointment calendars. In addition, the ITC card may be programmed to keep time and generate visual or audio alarms and to perform calculations, such as totalling deposits and purchases. The ITC may also be used to independently authorize a credit transaction and generate an approval code thus eliminating the need to use a bank terminal. A feature of the invention which facilitates the use of many different application programs in an ITC is the use of alphanumeric display 25 which provides a menu-driven user interface.

Not only may the same card be used for different applications or types of transactions, but the application programs may be removed, changed, or added to the card at any time. The danger of the software becoming obsolete is minimal since the software may be upgraded quickly and easily. At the same time, since the function of the card depends on the software, a card having the same physical components may be used in numerous applications, thus permitting high volume production and accompanying cost reductions.

The application programs may only be input by authorized manufacturers or issuers of the ITC. This secures the ITC against unauthorized access and programming or reprogramming. The application programs are preferably input by the issuer of the card through the input/output ports. For example, if the ITC is used for payment of public transportation, the transportation authority would load the application into the ITC and issue the card to the cardholder. Once the application is loaded it may be protected by a personal identification number (PIN) or the equivalent such as biometric parameters which must be input into ITC before access to reprogram the application is permitted.

The application information programmed into the card is dependent upon the type of transaction the card is to perform. However, the information generally includes communication protocols, security information, transaction process protocols, as well as cardholder-specific information related to the transaction. For example, if the card is programmed to be used for banking transactions at automatic teller machines (ATM), the application information would include the protocol information for the card to communicate with the ATM, the security code in order to access the ATM, cardholder identification and account information.

A distinct advantage of the ITC is the secured nature of the card. The card may be programmed to any desired level of security. For example, before the cardholder can access any feature or function of the card, he may be required to enter in the proper security code. If data is transmitted from the ITC to another device, the data may be encrypted before transmission. Access to the software programmed into the ITC may have additional security attached to it such that only the supplier of the software and not the cardholder may read or modify the software.

The operating system provides the intelligence and flexibility required for the device. The operating system is an organized collection of programs and data that is specifically designed to manage the resources of the ITC and to simplify the application programs and control their execution on the ITC. These programs are described in detail in conjunction with FIGS. 3–12. Illustrative application programs that may be used in the ITC are described in conjunction with FIGS. 13–17.

Figure 3:
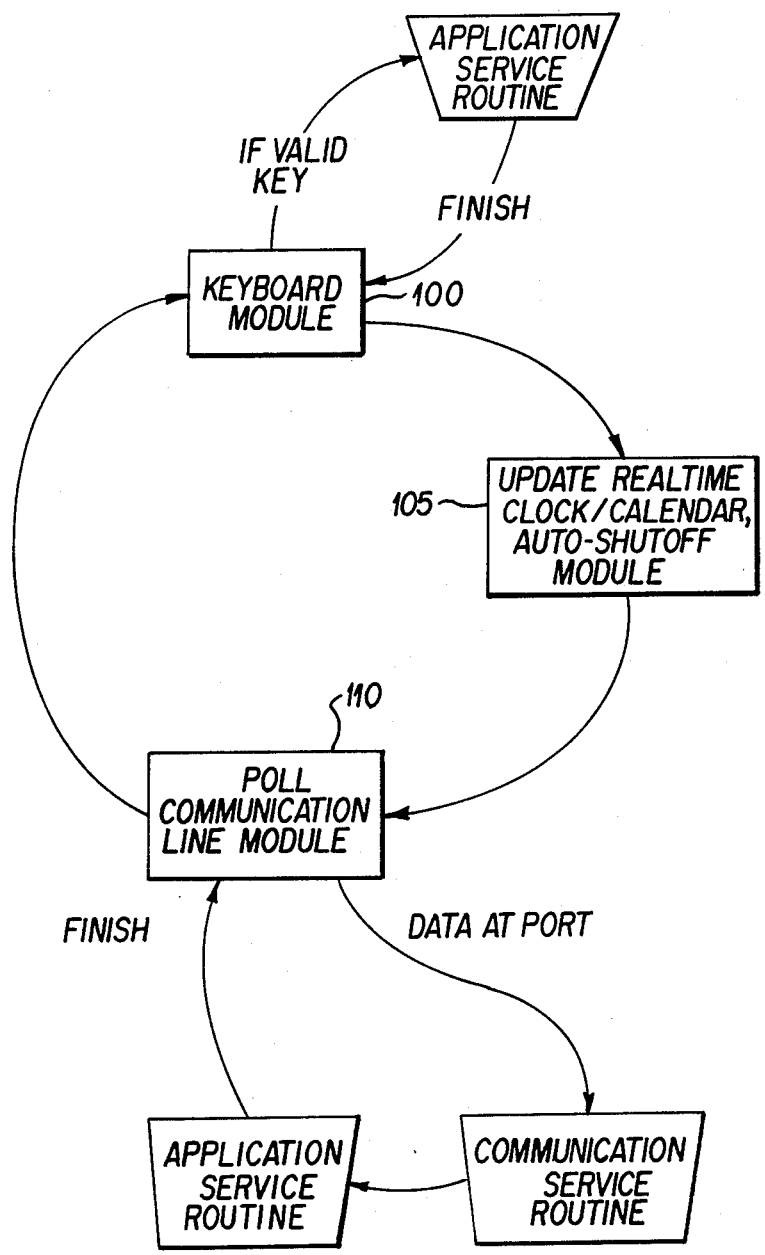
FIG. 3 illustrates the operating system flow.

The operating system software is written in modular fashion. This allows for dynamically reconfiguring the modules for ease in adding or modifying features. Referring to FIG. 3, the system runs a plurality of system modules in a continuous serial manner. These modules are: keyboard module 100, clock module 105, and communication module 110. The operation of these modules is explained in conjunction with FIGS. 4, 5 and 6, respectively.

The operating system also provides a plurality of service routines to operate or service basic system functions. These service routines include a keyboard service routine, a display service routine, a communication service routine, a memory management service routine, an application service routine, and a system clear/restart service routine. These routines are explained in conjunction with FIGS. 7–12, respectively.

These service routines are utilized by the application programs and the system modules. The modules and service routines are addressed through a vector table allowing for the change or substitution of modules without a major change in the system. The vector table acts like an index to indicate where in memory each module is located.

While in the "idle" state, i.e. while no application programs or service routines are operating, the modules operate in a polling configuration wherein each module is checked sequentially to determine if it has any activity that must be serviced. If the module does not need any servicing, the control of the system will pass on to the next module. For example, keyboard module 100 checks to see if a key has been depressed on the keyboard. If no key has been depressed, the routine is exited and the next module is executed. If a key has been depressed, the keyboard module then reads the keyboard entry. It also provides for the "debouncing" of the key so that no more than one signal is transmitted for each key that has been depressed.

Figure 4:
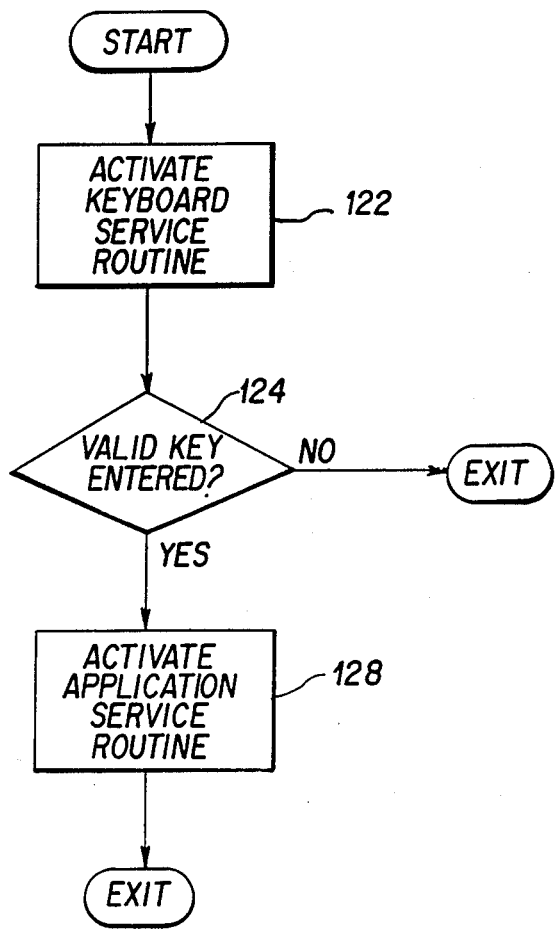
FIG. 4 is a flowchart of the keyboard module.

As shown in FIG. 4, the keyboard module first activates at step 122 a keyboard service routine to determine if a key has been depressed or otherwise selected by the cardholder. At step 124 the module tests if a valid key has been entered. If not, the module is exited. If a valid key has been entered, system control is switched to the application service routine at step 128 which determines the particular application, if any, that is requested by the valid key that has been entered. The module is then exited.

After system control is returned from the keyboard module, update clock/calendar auto-shutoff module 155 is activated. The actual clocking of time is implemented in hardware. A crystal provides the timing for an interrupt to increment the elapsed time every $\frac{1}{2}$ sec. If the clock is equal to 2400, the date is incremented and the time is reset. The clock module tracks the current date and time on the display as well as controls the auto-shutoff procedure for the system in the idle state. The auto-shutoff procedure automatically turns the ITC off after a predetermined time period has elapsed during which time there had been no activity on the system. An auto-shutoff feature is also provided when the system is not in the idle state.

Figure 5:
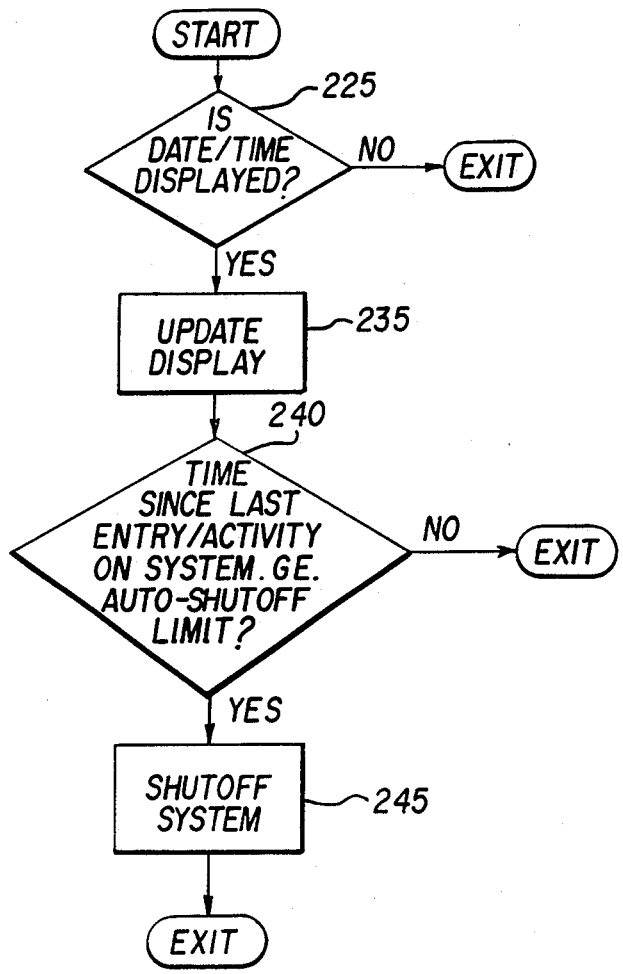
FIG. 5 is a flowchart of the update clock/calendar auto-shutoff module.

Referring to FIG. 5, if the date and time are not currently displayed at step 225, the module is exited at step 230. If the date and time are displayed, this indicates the system is on and is in an "idle state", i.e. no applications are currently operating. The date and time are updated at step 235 and the amount of time since the last system activity is checked at step 240. If the time which has elapsed since the last system activity is less than the auto-shutoff time limit, the module is exited, system control is returned and the communication module is initiated. Otherwise the ITC is shut off at step 245 and the module is exited.

Communication module 110 determines if there is any information at the communication ports. If there is information at these ports, the communication service routine shown in FIG. 6 is initiated to read the information into the system and the application service routine is activated to determine the application requested.

Figure 6:
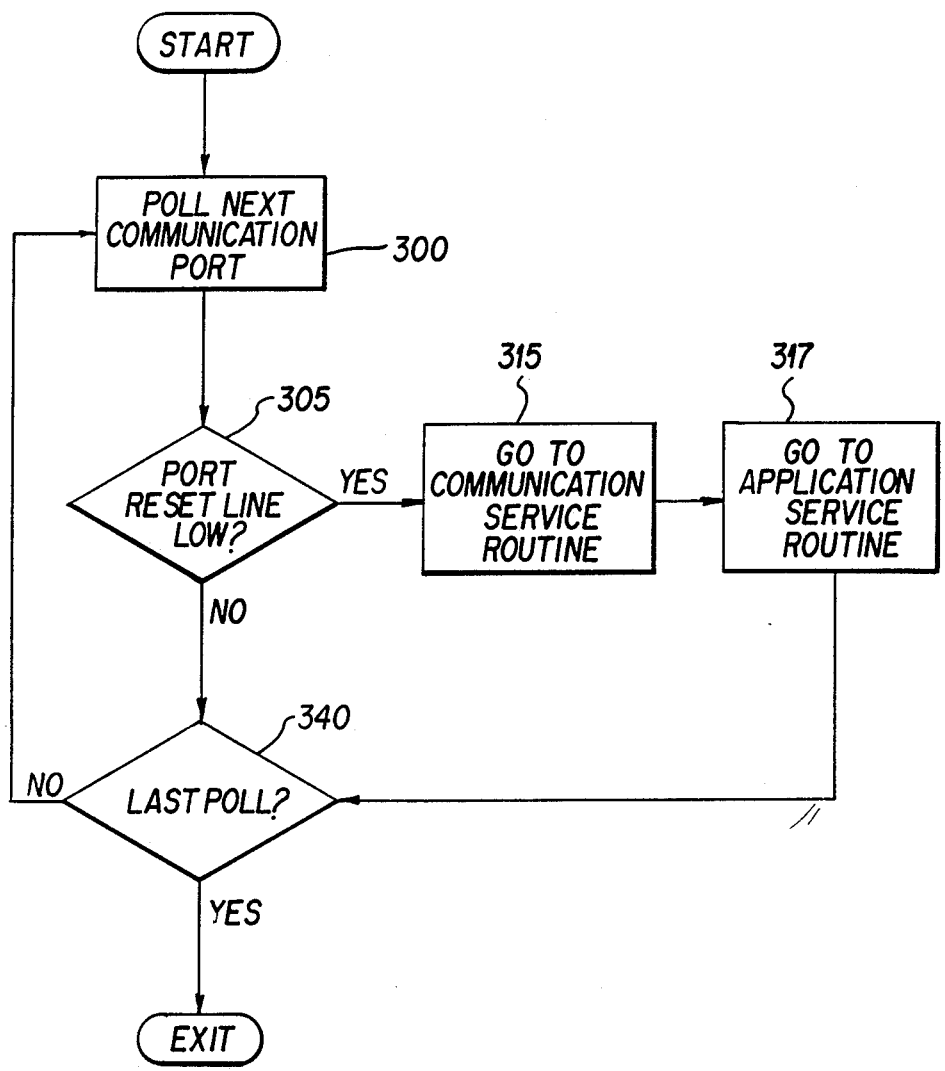
FIG. 6 is a flowchart of the communications module.

Referring to FIG. 6, at step 300 the first communication port is tested or polled. The port is polled by testing the port reset line. If the reset line is low, data is at the port; and at step 315 the communication service routine is activated. The communication service routine executes the proper data handshaking with the proper timing, reads in the data transmitted to the data port and stores it in a memory buffer. Since the only information that is presented to a communication port relates to a specific application, the application service routine is initiated at step 317 after the information is received from the port.

After the first port is serviced, the system tests at step 340 whether all the ports were polled. If all the ports were not polled, steps 300, 305, 315, 317 and 340 are executed for each port until all the ports have been polled. If at step 340 all the ports were polled, the module is exited.

As mentioned earlier, the operating system also comprises a variety of service routines that service or control some of the basic functions of the ITC. These routines are depicted in the flowcharts of FIGS. 7-12.

Figure 7A:
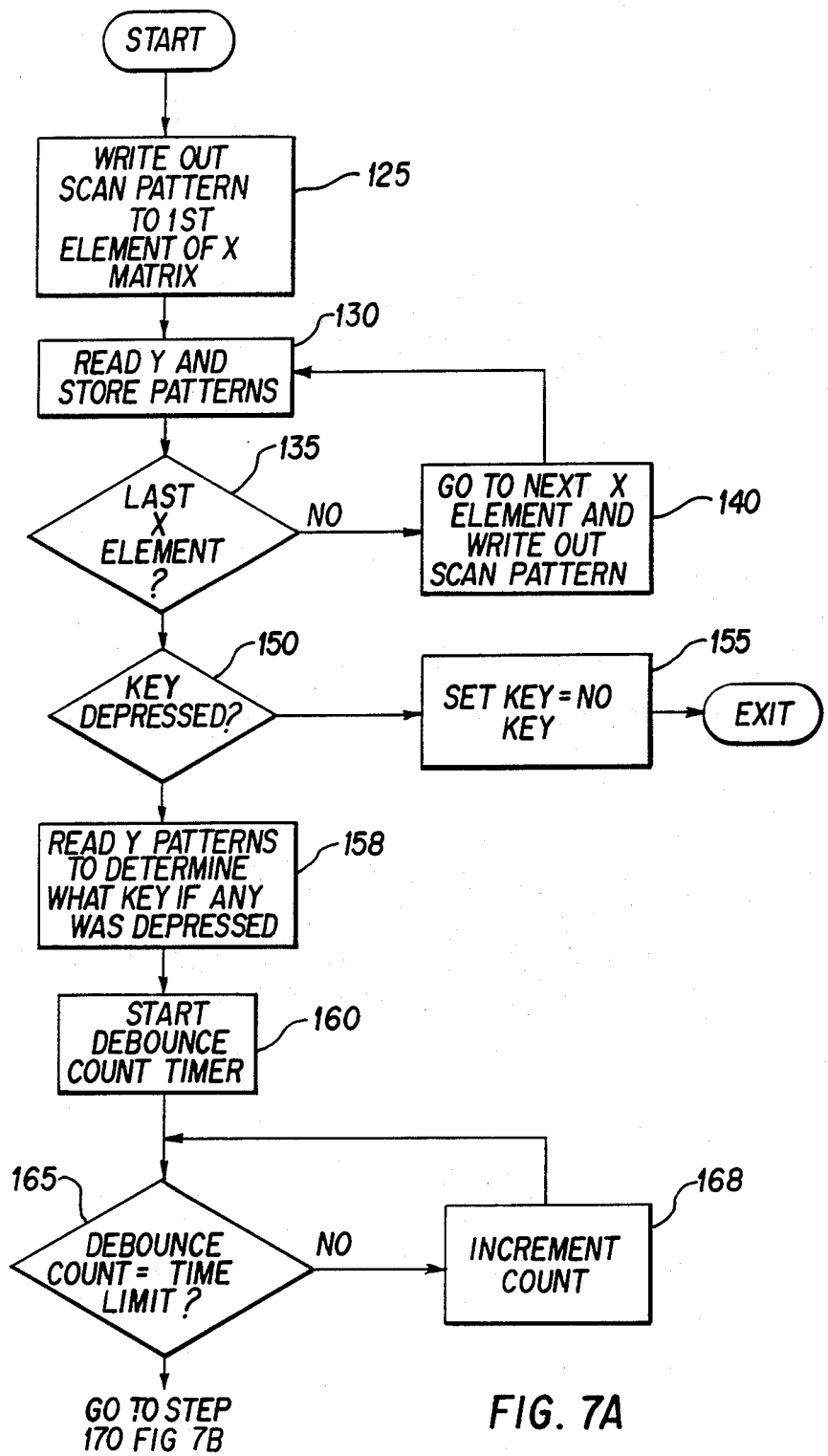
FIGS. 7A and 7B is a flowchart of the keyboard service routine.
Figure 7B:
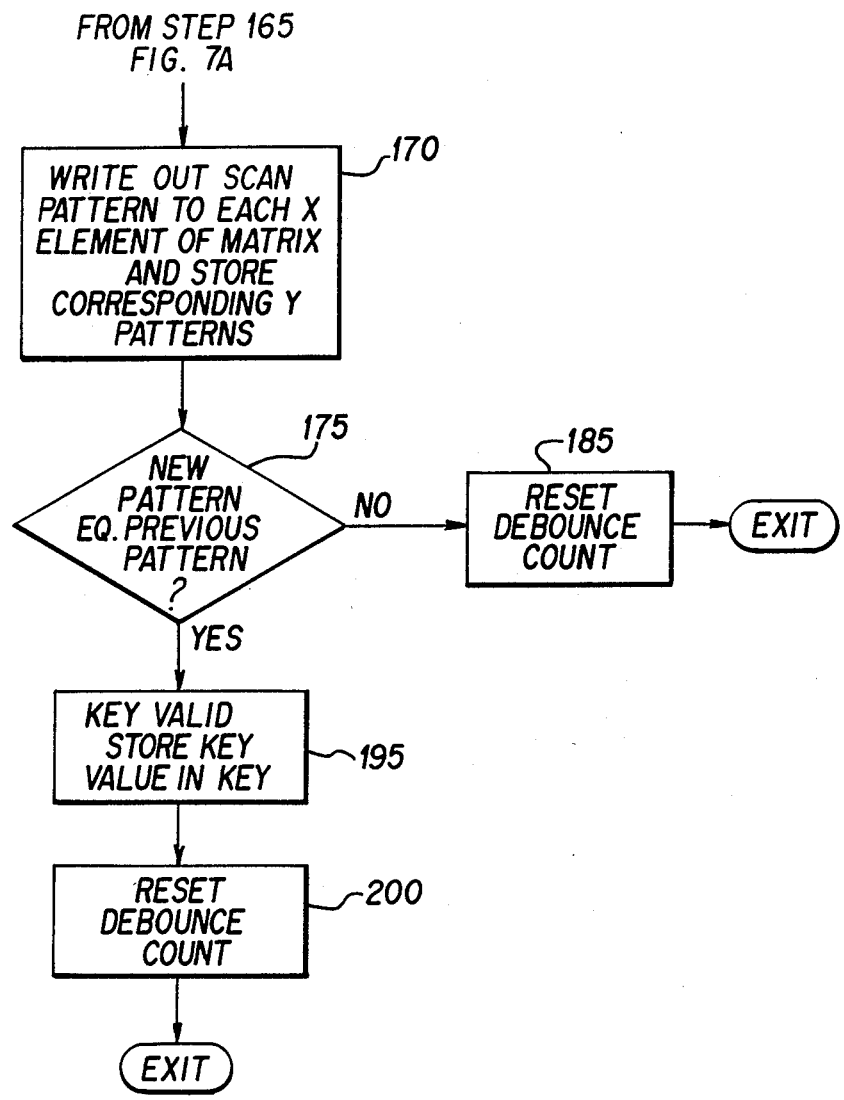

To understand the keyboard service routine shown in FIGS. 7A and 7B, it is helpful to understand keypad 20. Each key of the keypad is identified by an x-y coordinate pair in an x-y matrix. In each column, the keys are connected to an x-line to which a scanning signal may be applied; and in each row the keys are connected to a y-line on which a signal appears when a key is depressed (or otherwise selected) and its x-line is scanned. To determine whether a key has been depressed, a series of test signals is sent to the x lines of the matrix and the corresponding signal states at the y lines are read and stored.

As shown in FIG. 7A, at step 125 the scan signal for the first x line of the matrix is written to the matrix and at step 130 the signals on the y lines are read and stored in memory. At step 135 it is determined whether all the x lines at the matrix have been written to. If the last x line has not been written to, a scan signal is then written to the next x line at step 140 and the signals on the y lines are read and stored in memory at step 130.

After the last x line has been tested, the system checks at step 150 all the signals received on the y lines to determine if a key was depressed. If no key was depressed, the key register is set to a "no key" value at step 155 and the module is exited.

If a key has been depressed, the key value is determined at step 158. The debounce count timer is then initiated at step 160. If the debounce count is not equal to the time limit at step 165, the debounce count is incremented at step 168 and continues, in steps 165 and 168, until the debounce count is equal to the time limit. The time limit is of a duration such that any bouncing of the keys that may have occurred has ended. At this point, step 170, the matrix is written to and read again as described in steps 125, 130, 135, 140 and 145. At step 175, the newly read signals on the y lines are tested to determine if they are equal to the previously read signals. If not, the purported key depression is invalid, the debounce count is reset at step 185 and the module is exited. If the new signals are equal to the previous signals, the key is valid and the particular key value is stored in the key register at step 195. The debounce count is reset at step 200 and the module is exited.

Figure 8:
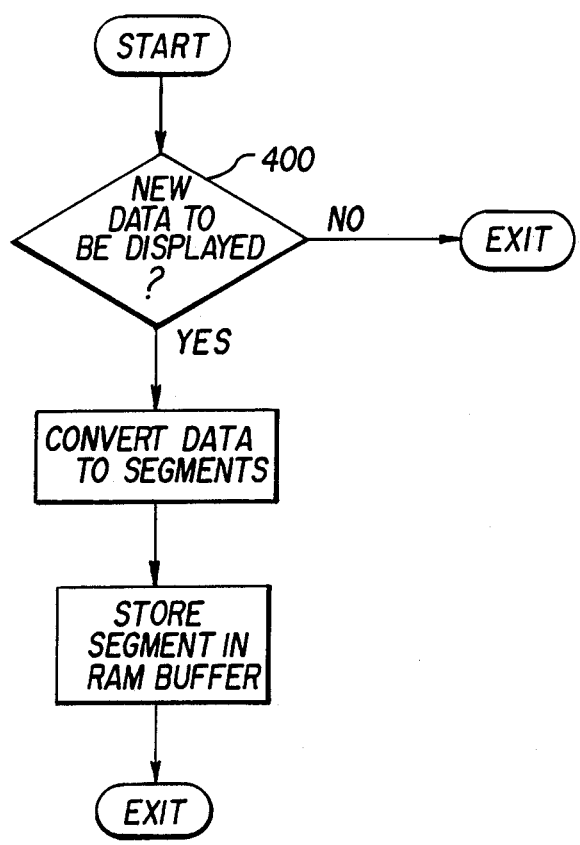
FIG. 8 is a flowchart of the display service routine.

The display service routine provides the necessary logic to operate the display. When the system determines during the operation of the modules, application programs or other service routines, that the display is to be changed, the display service routine is activated. Referring to FIG. 8, the system determines at step 400 if new data is to be displayed. If no new data is to be displayed, the routine is exited. If new data is to be displayed, at step 410 each character of the new data is converted into segments for a segmented display. This is done through a lookup table which identifies the segments of a display that correspond to each of the possible characters. At step 415 the segment identification is stored in the RAM display buffer. A separate processor, the display controller, cycles through the display buffer and turns the display segments on/off according to the segment identification in the display buffer.

Figure 9:
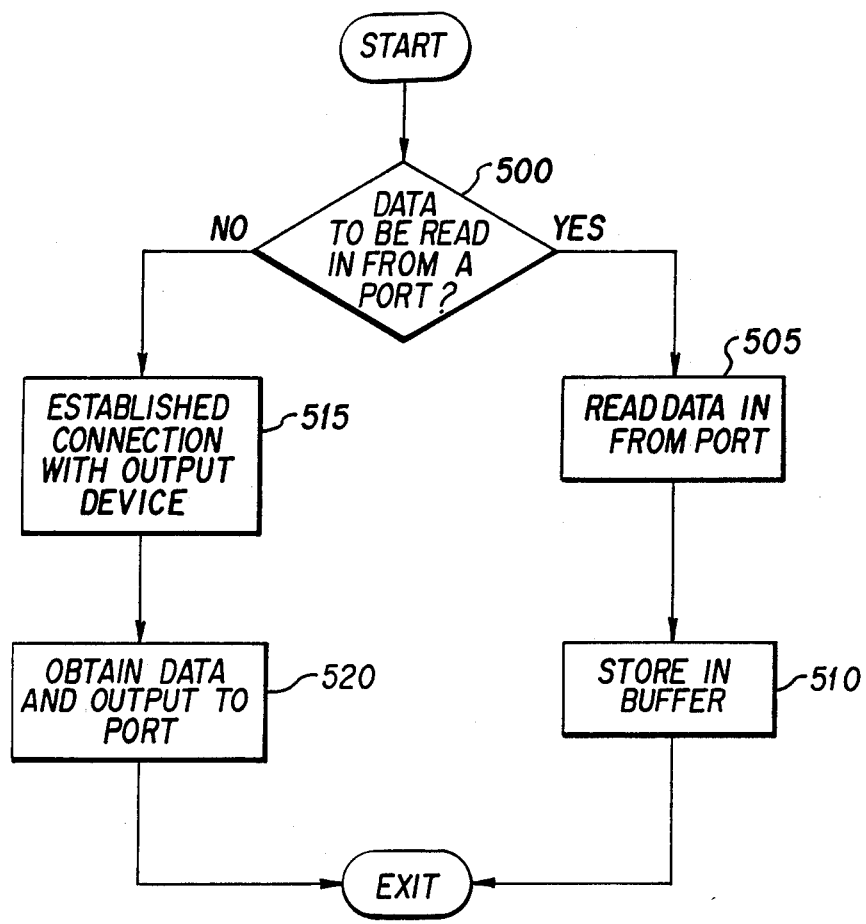
FIG. 9 is a flowchart of the communications service routine.

The communication service routine manages the actual input and output of information through the input/output ports in response to a request to read or write data. Referring to FIG. 9, at step 500 the program tests if data is to be read from a port. If data is to be read from a port, at step 505 the appropriate communication handshaking is executed and the data is read in from the input/output port. The data read in is stored at step 510 in a buffer for subsequent use by the module, service routine or application program that requested the communication service routine.

If the communication service routine is required to output data, at step 515 communication is established through the appropriate handshaking at the port with the outside device that is to receive the data. Once the communication is established, at step 520 the data is output through the port. At completion the routine is exited.

The memory in the ITC is separated into three areas: system data area, application data area and transaction data area. The system data area contains basic background system information. The application data area contains the program code for each application. The transaction data area contains data used in specific application programs. The memory management service routine supervises and controls the allocation and use of memory in the three data areas as well as provides timing sequences and control signals for proper operation.

The transaction data is organized into variable-length records having the format illustrated below.

| APPLIC. NO. | Data Size | PIN | Data | Check |
| --- | --- | --- | --- | --- |
| 8 bits | 16 bits | 8 bits | N bytes | 8 bits |

The application number identifies the particular application program the data is related to. The data size indicates the number of bytes of data in the record. The PIN is a personal identification number which must be equal to the PIN transmitted with a read request in order access the data in the record. The actual data is next in the record followed by one or more check digits which are used to insure data integrity.

Figure 10A:
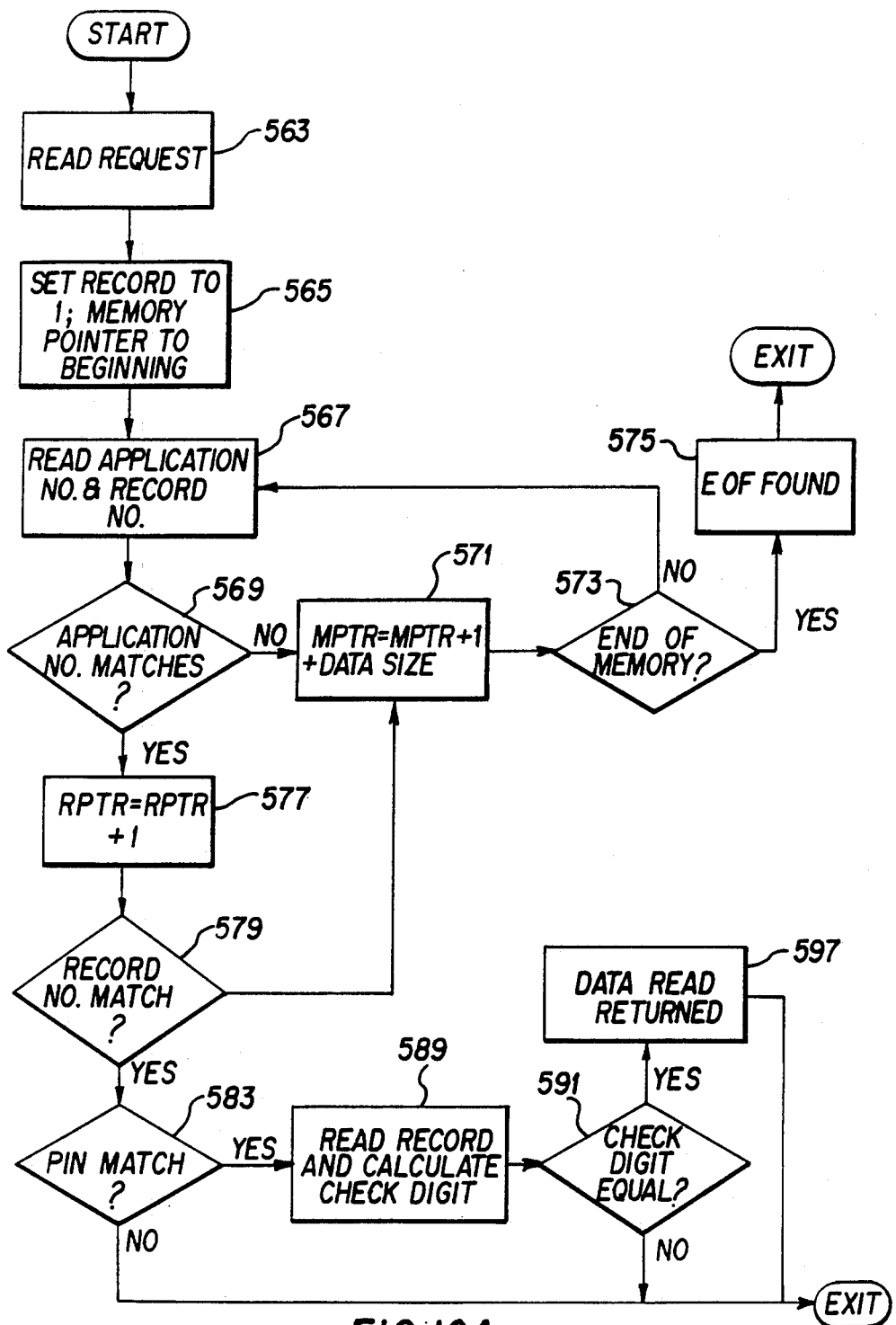
FIGS. 10A, 10B and 10C are flowcharts of the memory management service routines.
Figure 10B:
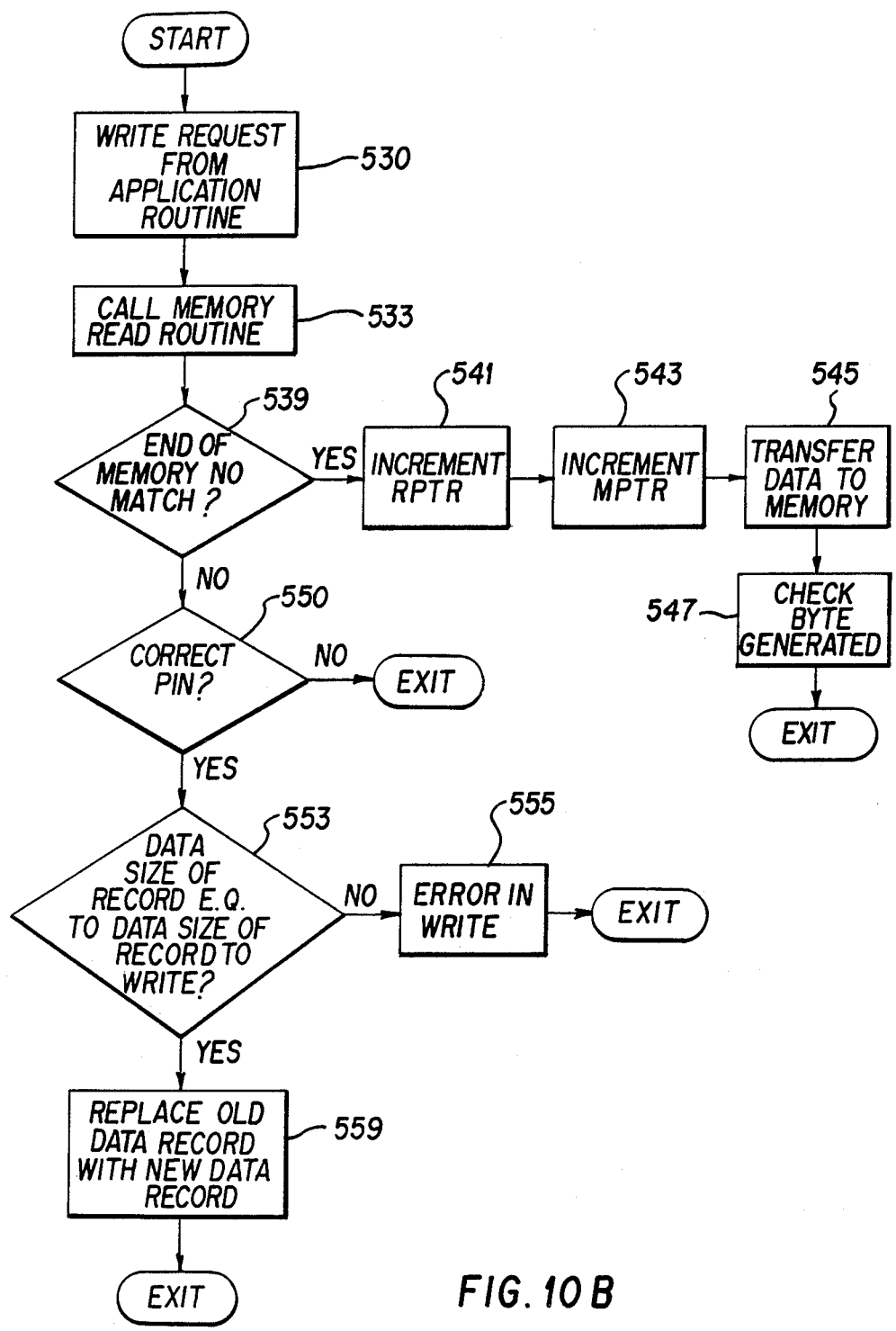
Figure 10C:
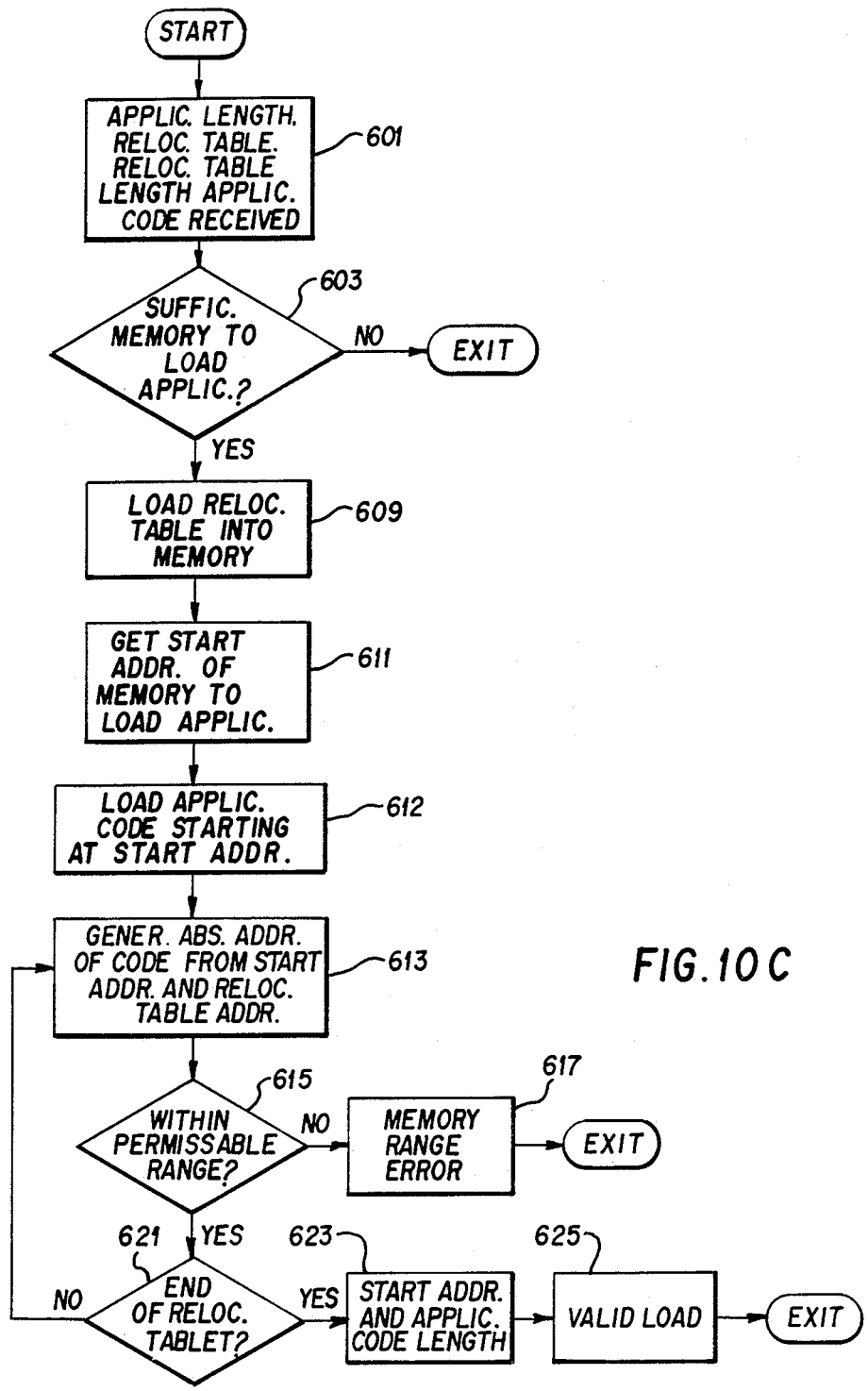

FIGS. 10A and 10B illustrate transaction read and write service routines which apply to any memory read/write request. FIG. 10C illustrates an application write routine which loads the application program code into the application data area of memory. Referring to FIG. 10A, when a transaction read is requested by an application program or service routine at step 563, the application number, record number and the corresponding PIN are passed from the application routine to the transaction read routine. In response to this read request, the transaction read routine will search the entire transaction data area until the specified record is found. Accordingly, at step 565 a memory pointer and a record pointer are initialized. The memory pointer indicates the memory location of the current record. The record pointer is a counter which keeps track of the number of records which are identified by the requested application number that have been reviewed thus far during the current read request.

The first four bytes of the initial record are initially read. They contain the application number, data size and corresponding PIN of the data record. At step 569 the application number requested is compared to the application number that is read from the current data record. If they do not match, at step 571 the memory pointer is incremented by an amount equal to the data size of the record plus one. This sets the memory pointer at the beginning of the next data record which is then designated as the current data record. The memory pointer is then tested, at step 573, to determine if it is at the end of the memory. If so, at step 575, an error message is returned to the application which requested the read function; and the read routine is exited. Otherwise the program returns to step 567 and reads the first four bytes of the next record. Steps 567, 569, 571 and 573 are executed until the end of memory is reached or the current application number matches the requested application number. If the current application number matches the requested application number, the record pointer is incremented at step 577 by one and the record number requested is compared at step 579 with the current record number reflected by the record pointer. If the record numbers do not match, steps 571, 573, 567, 569 and 579 are repeated until the requested application number and record number match the application number and record number of the current data record or the end of memory is reached.

Once a match is found, the PIN associated with the data record is compared at step 583 with the PIN transmitted with the read request to protect against unauthorized access of the information. If the PINs do not match, there is an error. The routine is exited, and the program returns to the application program which requested the read routine. If the PINs match, the data record is read at step 589, and a check digit is calculated. The calculated check digit is then compared at step 591 with the check digit stored in the data record. If the check digits do not match, a read error has occurred; and the routine is exited. If the check digits are equal, the data read from memory is returned at step 597 to the application program which requested the information.

Referring to FIG. 10B the use of the transaction write service routine is illustrated. At step 530 an application program or service routine makes a request to write data into memory relevant to a transaction. The transaction read routine is first activated at step 533 to determine whether the data record already exists in memory. The read routine returns to the write routine a message indicating that the end of memory was reached without finding a record match, the record already exists, or the record exists but the PIN transmitted with the request does not match the PIN stored in the data record.

At step 539 the system tests if during the read routine the end of memory was reached without finding a record match. If no record match was found, a new data record is written into memory. During the read routine performed at step 539, the record pointer (RPTR) counted the number of records in memory having the requested application number. At step 541, the record pointer is incremented by one to accommodate the new record. The value of the record pointer is then returned to the application program or service routine that requested the write routine. The memory pointer (MPTR) is set to point to the next available memory location at step 543 and at step 545 the data is written into memory at the locations specified by the memory pointer. When all the data has been transferred to the specified memory locations, a check byte is generated at step 547 and is stored at the end of the data record and the routine is exited.

If a record match is found, the system tests at step 550 if an error message was returned by the read routine indicating that the PIN stored in the record does not match the PIN transmitted with the request. If the error occurred, the error is noted and the routine is exited without performing the write request.

If a record match is found and the PIN stored in the record matches the PIN transmitted with the request, the data record to be written will replace the preexisting data record. At step 553 the size of the preexisting data record is compared to the size of the replacement data record. If the size of the data records are not equal, an error is flagged at step 555 and the routine is exited. If the size of the data records are equal, a valid write can be executed and at step 559 the memory pointer is set to replace the old data record with the new data record. The routine is then exited.

Referring to FIG. 10C, the loading of application program code into memory is illustrated. Typically, the code will be input into the system from an external device through one of the electrical or optical input/output ports. At step 601 data specifying the length of the application, a relocation table of absolute address references which must be recalculated after they are placed in memory, the length of the relocation table and the application code itself are input into the system. At step 603 the system checks if enough memory remains unused to store the application program code. If there is not enough memory available to accept the application, a memory error is noted at step 605 and the routine is exited without loading the application. If there is sufficient memory to load the application, the relocation table is temporarily loaded into memory at step 609. At step 611 the starting memory address of the application is determined and the application code is loaded at step 612 into memory starting at that memory address.

Steps 613, 615, 617, 619 and 621 describe the process of relocating address references based on the starting address in memory where the application code is stored and the relative addresses within the application code itself. At step 613 the absolute address for each relative address is determined by adding the starting address to each relative address stored in the relocation table. At step 615 the absolute address is verified to be within the permissible range of memory, that is, the address is checked to insure that it references code that is within the loaded application or globally defined routines (e.g. service routines). This prevents the application from directly addressing other applications or non-existent memory. If the absolute address is not within the permissible range, a memory range error is noted at step 617 and the routine is exited without completing the application loading process. If the absolute address is within the permissible range, the absolute address replaces the relative address in the application code. Steps 613, 615 and 617 are repeated, as necessary, for each element in the relocation table until it is determined, at step 621, that the end of the relocation table has been reached. After all the addresses have been relocated and verified to be within the permissible memory range, the relocation table is erased, at step 623 the starting address of the application is added to a code list containing the addresses of all the application programs, a valid load is noted at step 625, and the routine is exited.

Figure 11:
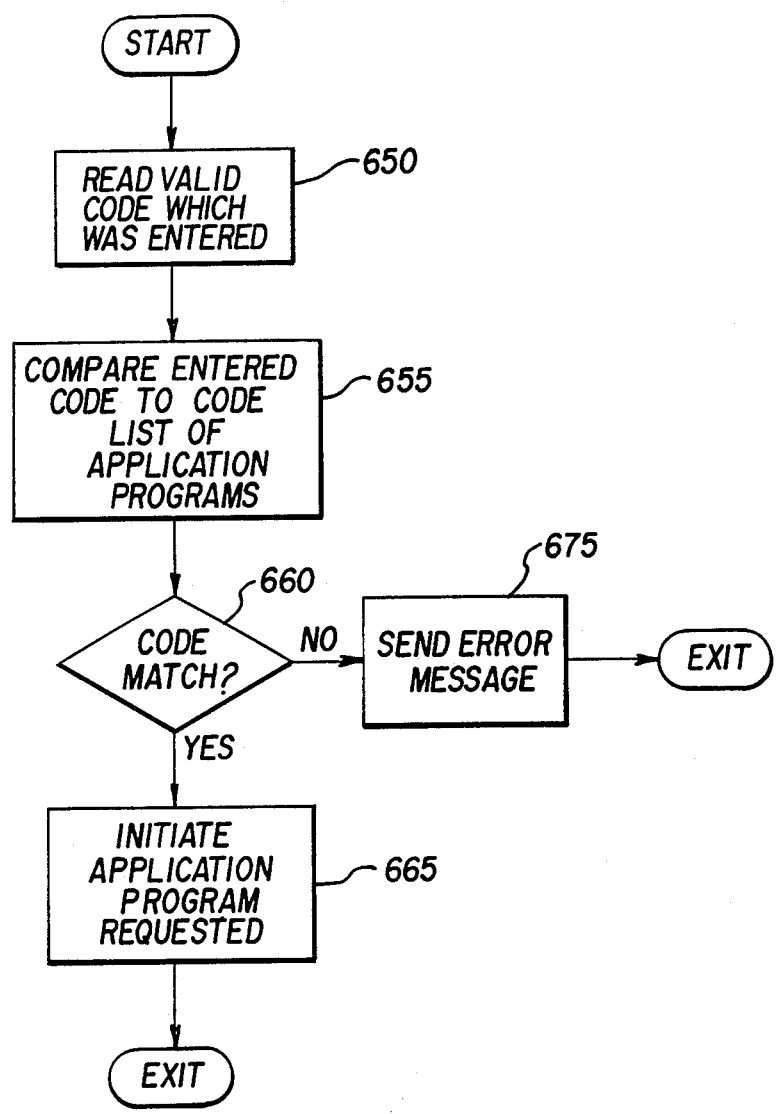
FIG. 11 is a flowchart of the application service routine.

The application service routine determines what application routine, if any, is requested and switches system control to the requested application program. Referring to FIG. 11, the code entered either through the keyboard or through input/output ports is read at step 650 and compared at step 655 to a code list of application programs and their starting addresses in memory. If at step 660 the code entered matches an element on the code list, the corresponding application program is initiated at step 665 and the application service routine is exited. If the code does not match any of the elements in the code list at step 660, an error message is displayed at step 675 if the code originated from the keyboard or is transmitted back to the input/output port if the code originated from an external device connected to the input/output port. The routine is then exited.

Figure 12:
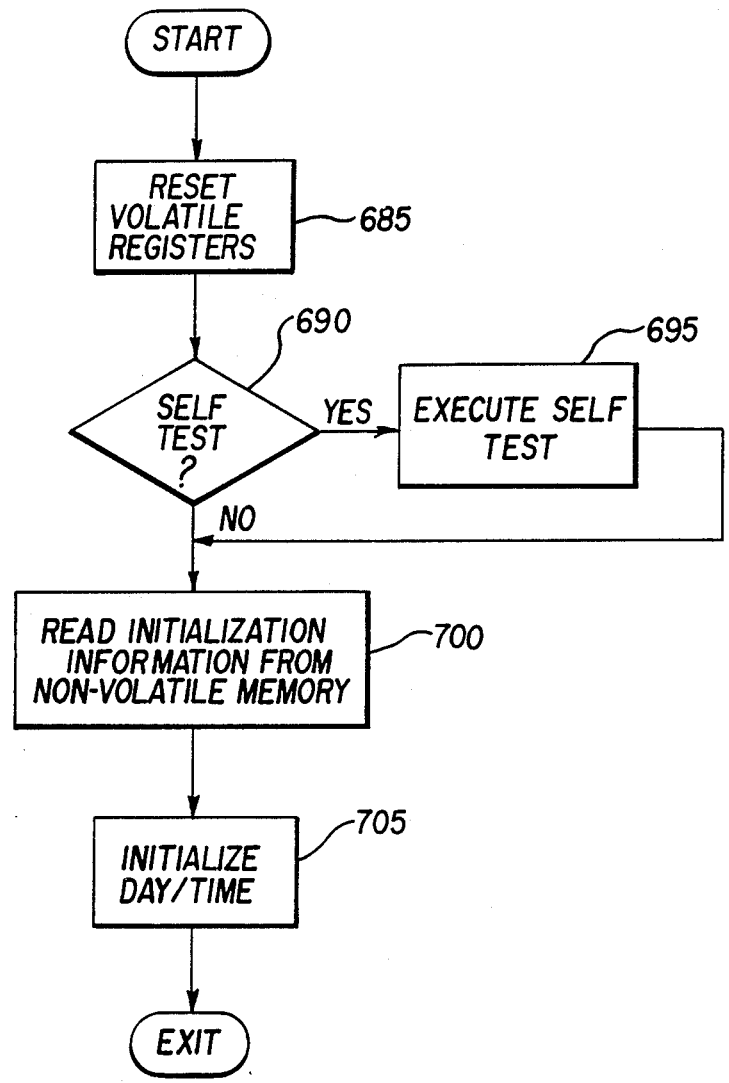
FIG. 12 is a flowchart of the system clear/restart service routine.

Another service routine is the system clear/restart service routine. Referring to FIG. 12, at step 685 the volatile registers are reset. A test is then made at step 690 to determine if a self test is required. If so, the self test is executed at step 695. At step 700, the initialization information required to restart the system is read from non-volatile memory. The cardholder is then prompted to set the date and time at step 705 and the routine is exited.

The operating system permits the ITC to be programmed for a variety of applications. The applications are realized through the application programs stored in the non-volatile memory of the ITC. The application routine programs can be changed, removed or deleted according to the ITC cardholder's needs by the issuer of the card. Examples of the application programs are a cardholder notepad application, set time application, set date application, change pin application, credit/purchase application, transportation application and calculator emulator application program.

The cardholder is led through the proper operation of the ITC by a series of instructions or menus set forth on alphanumeric display 25. This makes the ITC quite easy to use and is of great benefit to the new, unskilled or infrequent user of the ITC who is unfamiliar with the ITC operating procedure.

The cardholder operates the ITC through a plurality of menus. The menus present to the cardholder the options that are available to the cardholder at that specific point in the program. The options presented may be sub-menus of the menu currently being displayed or the options presented may be a selection of variables to be used during the execution of an application program. For example, the cardholder may select a menu item identified by "CREDIT" to activate a credit function. A sub-menu of credit options, such as making a credit transaction or seeing the cardholder's credit balance, is then presented to the cardholder. Once the cardholder selects an application the cardholder is prompted to enter variables used in the application. These variables may be presented in a menu giving the cardholder the ability to select a variable value from a menu. For example, if the cardholder wished to convert currency, the cardholder would indicate what country to convert the currency to. This may be accomplished by selecting a country from a menu list of countries.

As will be illustrated in the following description of application programs in conjunction with FIGS. 13–17, the cardholder uses the "YES", "NO", "NEXT" and "BACK" keys, referred to as the application control keys, to control the execution of the application programs. The NEXT and BACK keys are used to scroll or view different options available at that time to the cardholder and the YES and NO keys are used to enter and exit different menus, applications or portions of applications.

For convenience, the displays generated by the program are depicted in block capital letters enclosed in a box. Operations performed by the user or by the microprocessor are set forth using lower case letters.

When the ITC is operating, the system is normally in an idle state. While in the idle state, the current date and time are displayed. The cardholder may then scroll display 25 (FIG. 1) through the basic functions or applications contained in the ITC, by pressing the NEXT key to go to the next function or the BACK key to return to the previous function. If the cardholder wishes to select one of these functions for data input or output, he scrolls through the functions until the desired function is displayed and then depresses the YES key to activate that function.

Figure 13:
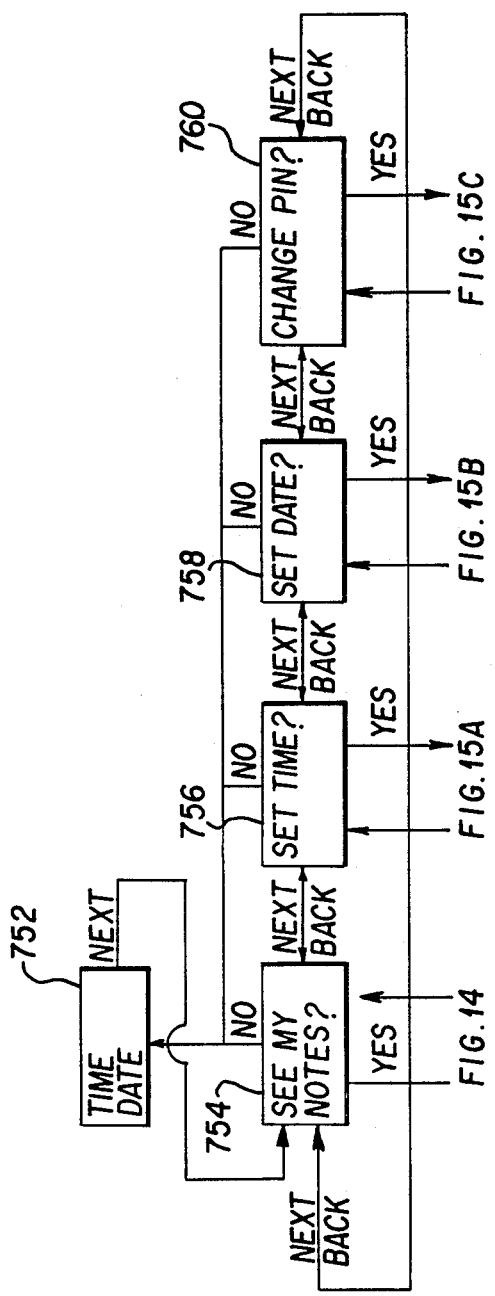
FIG. 13 illustrates the basic structure and access of the application programs.

This operation of the ITC is illustrated in FIG. 13 which depicts in boxes 752, 754, 756, 758 and 760 five illustrative displays comprising a menu that is generated at display 25 by one embodiment of an ITC of the present invention. In the idle state TIME and DATE are displayed as shown in box 752. By use of the BACK and NEXT keys display 25 may be changed successively to those shown in boxes 752–760. The displays shown in boxes 756–760 are prompts for standard functions which typically are found in any ITC. These functions are described in detail in conjunction with FIGS. 15A–C. Additional functions or applications may be supported by the ITC system according to cardholder requirements. These applications may be accessed using the NEXT/BACK/YES keys or by depressing a function key programmed to activate that particular application.

One example of an additional application program that can be implemented in the ITC is the notebook application depicted in FIG. 13. To activate the notebook application, the cardholder scrolls through the application program options until "SEE MY NOTES?" is displayed as illustrated in box 754. The YES key is then depressed to activate the application.

Figure 14:
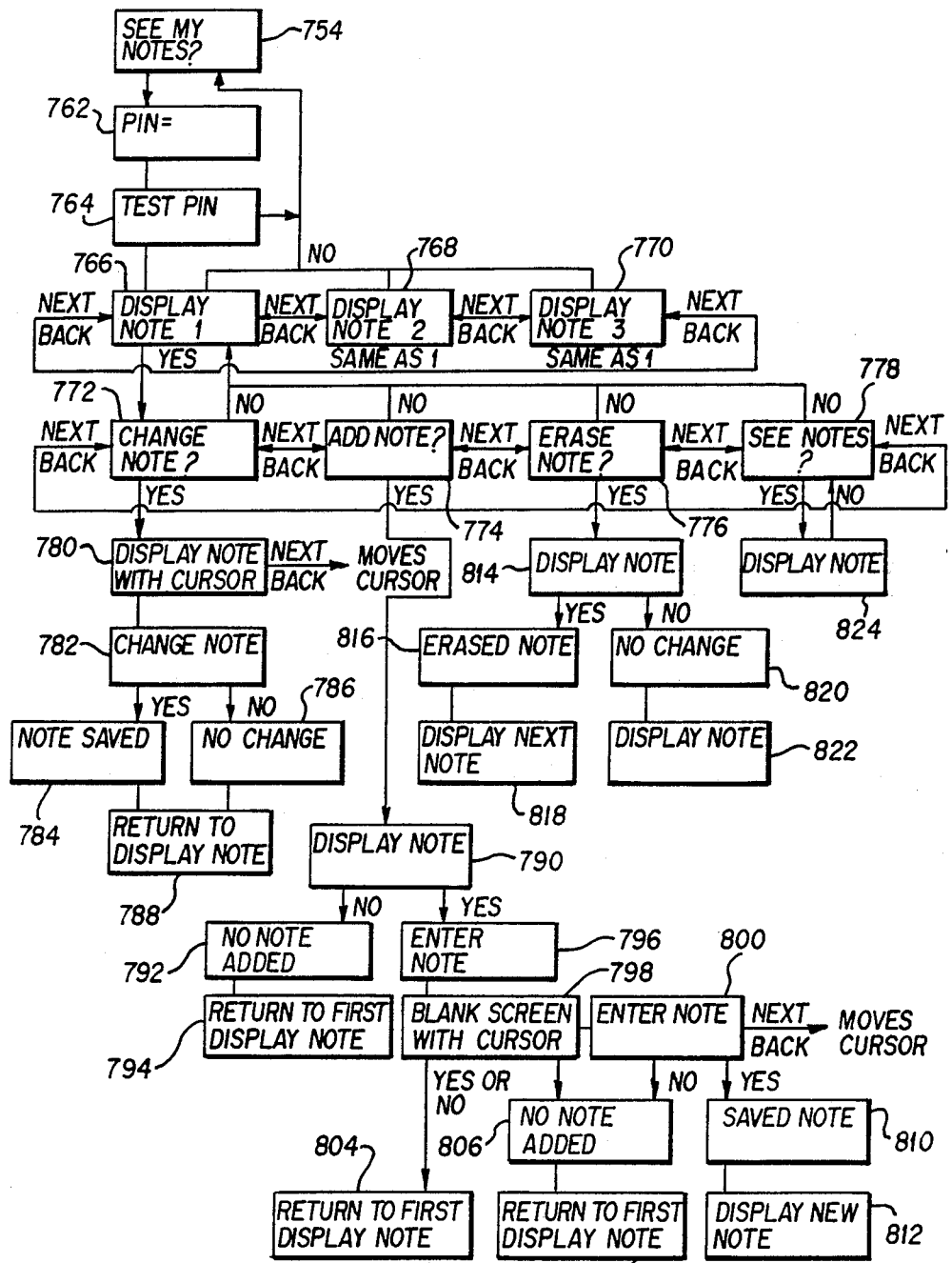
FIG. 14 is a flowchart of the cardholder notes application program.

The notebook application is described in more detail in FIG. 14. After selecting this application, the cardholder is prompted by display 25 to enter in his PIN by the prompt depicted in box 762. The entered PIN is then tested at step 764 against a PIN that is stored in the ITC in conjunction with this application program. This prevents unauthorized access to this application program because the cardholder should be the only person who knows his PIN. If an incorrect PIN is entered, system control exits the application program and returns to the point in the program that generates the display shown in box 754.

If the cardholder enters the correct PIN, the system displays on display 25 the first note stored in memory as shown in box 766, indicating to the cardholder that he now can access his notes. Using the NEXT and BACK keys the cardholder can scroll through the different notes as illustrated by boxes 766, 768 and 770 until he finds the particular note he wants to select. The cardholder selects a note to work on (the "current note") by depressing the YES key. The user is then prompted by display 25 to select a particular note function in accordance with the displayed prompts shown in boxes 772, 774, 776 and 778 by scrolling among these functions using the NEXT/BACK keys and selecting the function using the YES key.

To change a note the cardholder scrolls through the options presented until "CHANGE NOTE?" reflected by block 772 is displayed. Upon depression of the YES key, the current note is displayed at block 780 with a cursor highlighting the first letter of the note. Using the NEXT/BACK keys to move the cursor, the displayed note may be changed at step 782 by positioning the cursor on the letter to be changed and altering the letter by depressing a new key on the keypad. The cardholder may save the changes by depressing the YES key whereupon the prompt "NOTE SAVED" shown in block 784 is displayed to tell the cardholder that the note was saved. If the cardholder wishes not to save the changes, the NO key is depressed at which time the message "NO CHANGE" is displayed as shown in block 786. The system then displays again, as indicated by block 788, the current note. To exit the function the NO key is depressed.

To add a note, the cardholder scrolls through the menu presented by display 25 until "ADD NOTE" as shown at block 774 is displayed. He then depresses the YES key to select the function. The current note is then displayed as indicated by block 790. The new note will be added after the current note. If the cardholder depresses the NO key, the display 25 indicates "NO NOTE ADDED" as shown at block 792 and returns at step 794 to display the first note as indicated at block 766. If the cardholder depresses the YES key, a prompt "ENTER NOTE" is displayed, as indicated by block 796 and a blank screen with a cursor is then presented on display 25 to give the cardholder the opportunity to add a note as reflected by blocks 798 and 800. The NEXT and BACK keys enable the cardholder to move the cursor through the text of the note. If no information is added and the YES or NO key is depressed, at step 804 the system returns to block 766 and displays on display 25 the first note stored in memory. If information is entered and the NO key is depressed, the message "NO NOTE ADDED" is displayed as indicated by block 806, and the system returns and displays the first note at block 766. To save the note added the cardholder depresses the YES key. The message "SAVED NOTE" is displayed as shown at block 810 followed by the display of the new note as indicated at block 812.

To erase a note, the cardholder scrolls through display 25 until "ERASE NOTE" as depicted in block 776 is displayed and depresses the YES key. The current note is then displayed. If the cardholder depresses the YES key again, the message "ERASED NOTE" is displayed as shown at block 816 and the next display note in the series of notes represented by blocks 766, 768 and 770 is displayed at block 818. If the cardholder does not wish to delete the note displayed, the NO key is depressed. The message "NO CHANGE" is displayed at block 820, indicating to the cardholder that the note was not erased. The current note is then displayed as indicated in block 822.

If the cardholder wishes to see the current note he scrolls through display 25 until the prompt "SEE NOTE" is displayed as shown in box 778. The note is displayed, as depicted in block 824, upon depression of the YES key.

Once operation of the functions are complete, control returns back to one of the notes represented by boxes 766, 768 and 770 enabling the cardholder to select another notepad function. To exit the notepad application, the cardholder depresses the NO key when the contents of one of boxes 766, 768 or 770 is on display. This returns system control to the display shown in box 754 at which point the user can select another application.

Figure 15C:
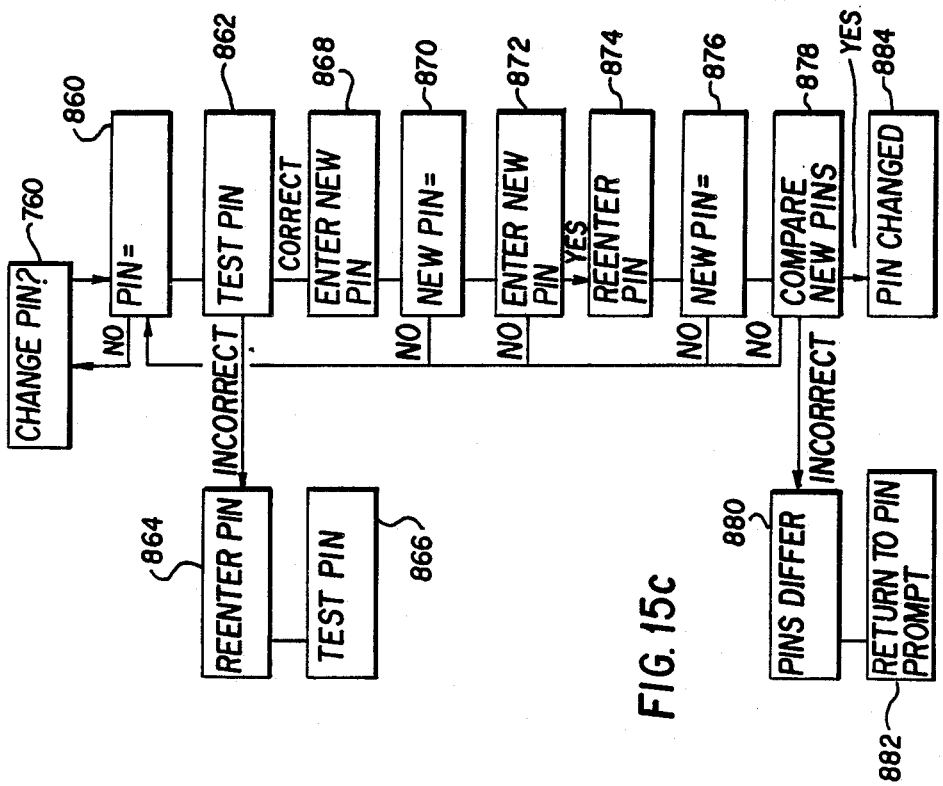
FIG. 15C is a flowchart of an application program to change the cardholder's personal identification number (PIN).
Figure 15A:
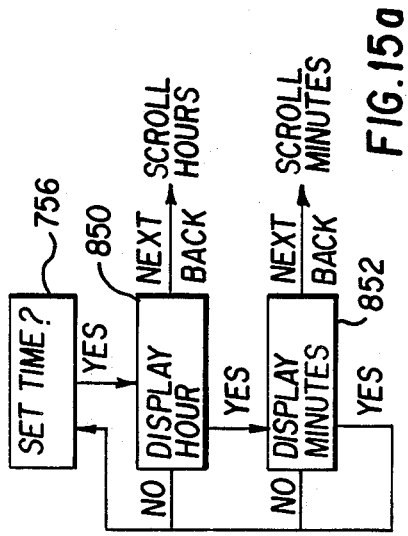
FIG. 15A is a flowchart of the set time application program.
Figure 15B:
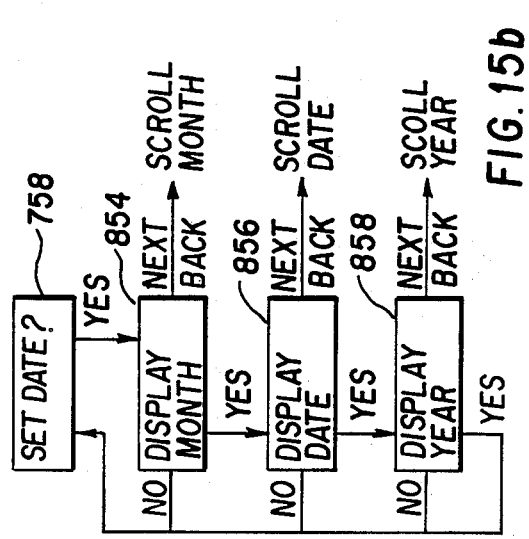
FIG. 15B is a flowchart of the set date application program.

FIGS. 15A, 15B and 15C illustrate the set time, set date and change PIN applications. If the set time function is selected, the hour is first displayed at step 850 and the cardholder is given the opportunity, using the NEXT and BACK keys, to modify the displayed hour. The YES key is then depressed, storing the hour value displayed and displaying the minutes at step 852. The cardholder may then modify the minutes using the NEXT and BACK keys to increment and decrement the numbers. To enter the change, the cardholder depresses the YES key. If the NO key is depressed, the application is exited without making the change.

Similarly, referring to FIG. 15B if the cardholder selects the set date function, the month is first displayed at step 854, followed by the date at step 856 and the year at step 858. The cardholder may modify each using the NEXT/BACK and YES keys.

Referring to FIG. 15C, if the cardholder selects the change PIN function, the cardholder is prompted to enter the current PIN by the display depicted in box 860. The entered PIN is then tested at step 862 against the PIN already stored in the ITC. If the PIN is incorrect, i.e. it does not match the PIN stored in the system, the system gives the cardholder another opportunity to enter the PIN by generating the display shown. The PIN that is entered is tested at step 866. If the correct PIN is entered, the cardholder is prompted for the new PIN he wishes to enter by displays 868 and 870. After the new PIN is entered at step 872, the cardholder is prompted to reenter the new PIN by displays 874, 876. At step 878, the two new PINS are compared. If the PIN entered in response to the display at box 876 does not match the PIN entered in response to the display at box 870, an error message is displayed as shown at box 880 and the cardholder is given another opportunity to enter the correct PIN by returning the program to the point at which the display shown in box 870 is generated. If the cardholder fails to enter in the correct PIN after a predetermined number of tries, the new PIN does not replace the current PIN and the system returns to the point that generates the display of box 860 where the cardholder has to again enter the current PIN. If, at step 878, the cardholder re-enters the new PIN correctly, the current PIN is replaced with the new PIN and the cardholder is informed of this by the display at box 884. The application is then exited.

Numerous other application programs may also be used in the ITC of the present invention. These programs may be stored in addition to or in place of the notebook application depicted in FIG. 14. Each program is accessed by scrolling the program prompts on display 25 by means of the NEXT and BACK keys and selecting the desired program by means of the YES key. Alternatively, at least some programs may be assigned a dedicated keyboard key for immediate access to that program.

Figure 16:
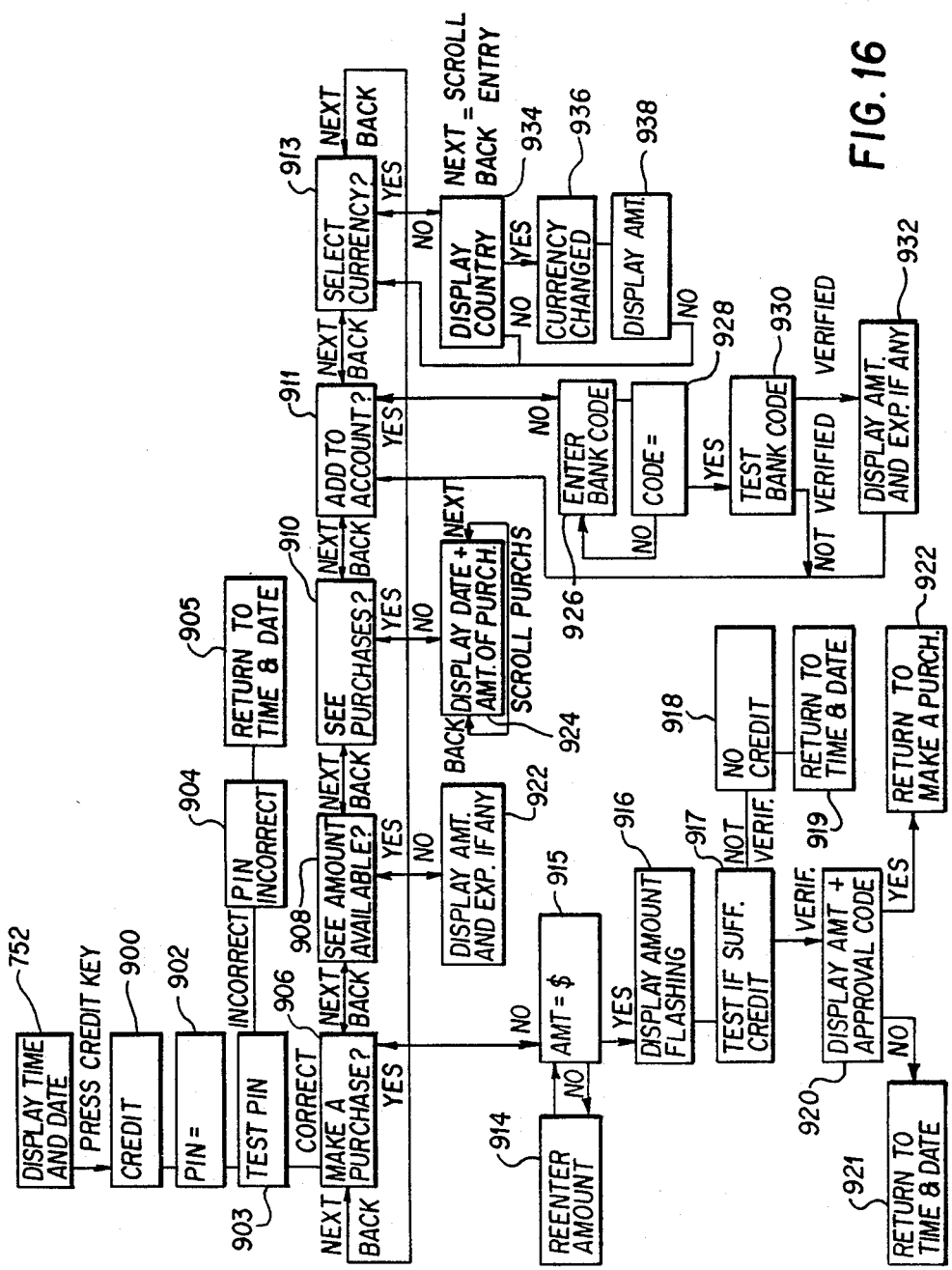
FIG. 16 is a flowchart of the credit/purchase application program.

FIG. 16 illustrates a credit/purchase application program. The cardholder activates this application program when performing credit transactions such as the purchase of goods or services. The program checks the cardholder's available credit balance and, if sufficient credit is available, generates an independent approval code authorizing the purchase. The approval code generated by the ITC eliminates the need for an approval code generated by an external credit approval service, for example, a credit card service bureau used by most merchants. The approval code is a unique encrypted code for the particular transaction generated from the amount, account number, account type and time and date of the transaction.

At step 752 (FIG. 13) the system is in an idle state as reflected by the display of the date and time. When the credit function key is depressed, the program is activated, indicated by the display of "CREDIT", as depicted by box 900. The cardholder is then prompted for his PIN by the display shown in box 902 and, following entry of the PIN, its validity is tested at box 903. If the correct PIN is not entered, an error message "PIN INCORRECT" is displayed to the user as shown at block 904 and the system exits the application at block 905 and returns to the idle state. If the correct PIN is entered, display 25 presents to the cardholder a plurality of options in the form of the prompts "MAKE A PURCHASE", "SEE AMOUNT AVAILABLE", "SEE PURCHASES", "ADD TO ACCOUNT" and "SELECT CURRENCY" depicted in blocks 906, 908, 910, 912 and 914. The cardholder scrolls through these prompts using the NEXT and BACK keys.

If the cardholder wishes to make a purchase using the credit available, the cardholder depresses the YES key when the prompt displayed is that of box 906. This activates the function. The cardholder is prompted by a display depicted in block 915 to enter in and verify the amount of the purchase. If the amount entered is incorrect, the cardholder depresses the NO key at step 915; and he is given another opportunity in response to the display "REENTER AMOUNT" depicted in box 914 to enter the correct amount at the prompt depicted at box 915. The cardholder verifies the amount entered by depressing the YES key. After the amount is entered and verified by the cardholder, the amount of the requested purchase is flashed on and off in the display 25, as reflected by box 916 and is compared at step 917 to the cardholder's credit balance stored in the card. If there is insufficient credit, the message "NO CREDIT" is displayed, as depicted by box 918 and the system returns at step 919 to the idle state in which the time and date are displayed as in block 752. If there is sufficient credit to complete the transaction, a unique approval code is generated and displayed indicated by box 920 along with the amount of purchase. The approval code may be noted by the merchant on the credit slip for securing the transaction.

The cardholder has the option at step 918, to exit the credit/purchase application program or perform another function with the application program. If the cardholder depresses NO, the application program is exited and the system returns at step 921 to the idle state in which the time and date are displayed as shown in box 752. If the cardholder depresses YES indicating he wishes to make another purchase, the system returns at step 922 to the point in the program at which the display of box 906 is generated.

The cardholder may view the credit balance available by scrolling the display to that of box 908 and selecting the function by depressing the YES key. The credit balance is then displayed at step 922. Similarly the cardholder may elect to see the purchases or transactions by scrolling the display to that of box 910 and selecting the function. The cardholder may then scroll through the list of purchases, displayed by amount and date, using the NEXT and BACK keys.

The cardholder may add to his credit balance by scrolling the display to that of box 912 and selecting the function. After the function is selected, the cardholder is prompted to enter and verify the correct bank code by the displays depicted in boxes 926 and 928. The bank code is typically provided by the bank to the cardholder and verifies the deposit made by the cardholder. Encoded in the bank code is the cardholder's account number, date of deposit and amount of deposit. If the cardholder makes an error in entering the bank code, he depresses the NO key which prompts him to reenter the bank code through the displays depicted in boxes 926 and 928. If the bank code is correct, the cardholder depresses the YES key. The bank code is then tested and verified at box 930. If the bank code is not verified by the ITC, the function is exited and the system returns to the point evidenced by the display depicted in box 11. If the deposit is verified, at step 932, the balance is updated to reflect the deposit, the new balance is displayed and system control returns to step 911.

The cardholder may also convert his credit into different currency simply by scrolling the display to that of box 914 and selecting the function by depressing the YES key. The cardholder is then presented at step 934 with a list of countries and selects, using the NEXT, BACK and YES keys, the country his wishes to convert his balance to. The cardholder is notified that his currency has been changed by the display in box 936 and his currency credit balance is displayed at step 938 in the selected currency. If the cardholder depresses the NO key at step 934, the function is exited and box 913 is displayed.

Figure 17:
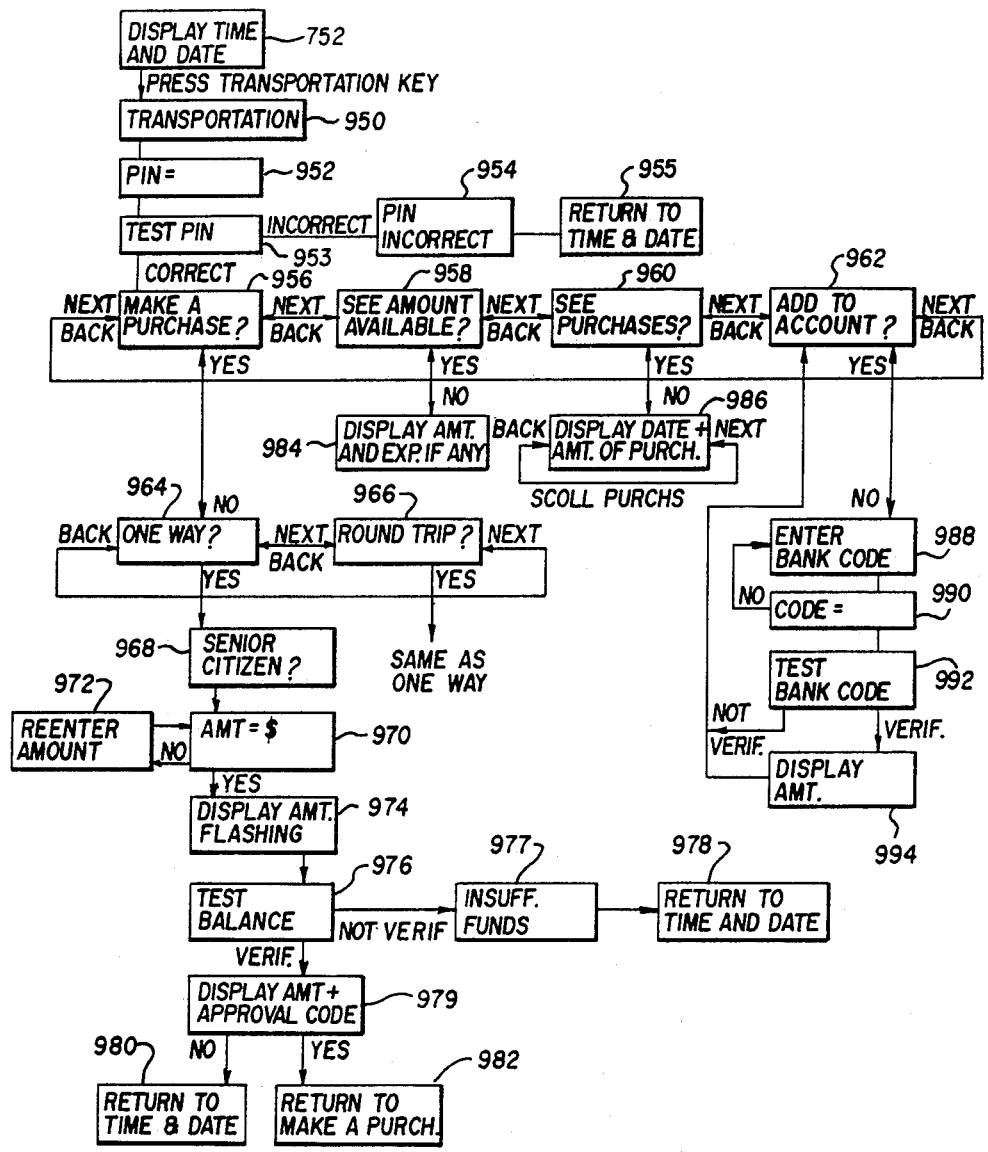
FIG. 17 is a flowchart illustrating the use of the ITC for transportation.

FIG. 17 illustrates the use of the ITC for transportation, for example, to pay for train tickets. When the display depicts time and date as depicted in box 852, the function key assigned to this application is depressed. A message indicating that this function has been selected is displayed as shown in box 950 and the cardholder is prompted to enter his PIN by the display depicted in box 952. The PIN is tested at step 953. If the PIN entered is incorrect, an error message "PIN INCORRECT" is displayed as shown at block 954, and the application is exited at block 955 to return to the idle state reflected by the display of the time and date shown in block 752. If the PIN entered is correct, the cardholder is presented a list of operations that can be performed through display of the prompts "MAKE A PURCHASE?", "SEE AMOUNT AVAILABLE?", "SEE PURCHASES?", and "ADD TO ACCOUNT?" as shown in boxes 956, 958, 960 and 962. The cardholder scrolls through the operations using the NEXT and BACK keys until the desired function is displayed and depresses the YES key which selects and activates the function.

To make a ticket purchase at the train station or on the train, the cardholder scrolls through the functions until "MAKE A PURCHASE" is displayed on display 25, as shown in block 956 and depresses the YES key to select the function. The ticket purchase function is activated and the user is prompted to select a one way or round trip ticket by the information shown in blocks 964, 966 that is displayed by display 25. Again, the NEXT, BACK and YES keys are used to scroll the display and make a selection. The cardholder is then prompted by the display at box 968 to indicate whether the senior citizen fare applies and to enter the amount of the fare in response to the prompt shown in box 970. If a mistake is made in entering the amount the cardholder can depress NO; and block 972 is displayed on display 25 indicating that the amount is to be reentered. The cardholder is then prompted to reenter at block 970 and verify the correct amount. When, at block 970, the cardholder verifies the correct amount by depressing the YES key, the amount is flashed on the display, as indicated by box 974 and the system tests at block 976 whether there is sufficient funds to cover the ticket purchase. If there is insufficient funds the message depicted in box 977 "INSUFFICIENT FUNDS" is displayed and in step 978 the system returns to the idle state reflected by the display of the time and date. If the cardholder has sufficient funds in his transportation account to complete the ticket purchase, the amount of the purchase is debited from the account and the approval code is generated and displayed with the amount at step 979. The cardholder is then given the opportunity depicted at blocks 980 and 982 to make another ticket purchase by depressing the YES key or exit the purchase function and return to the idle state by depressing the NO key.

To check the balance remaining in the cardholder's transportation account, the cardholder scrolls through the display 25 until "SEE AMOUNT AVAILABLE?" is displayed, as shown in block 958, and selects the function by depressing the YES key. The account balance is then displayed as indicated by block 984.

To view the date and amount of prior ticket purchases, the cardholder scrolls until "SEE PURCHASES" is displayed, as depicted in block 960, and selects the function. At step 986 the amount and date of the earliest purchase is displayed. The cardholder may then scroll through the display of the list of ticket purchases using the NEXT and BACK keys.

The cardholder can add funds to increase his transportation account balance through the "ADD TO ACCOUNT" function. The cardholder deposits or transfers money to his transportation account at a financial institution or transportation ticket office. The financial institution or ticket office supplies the cardholder with a unique deposit code which includes information such as the cardholder's account number and the date and amount of deposit. The cardholder, upon receipt of the deposit code, initiates the function at the ITC by scrolling until the "ADD TO ACCOUNT" function is displayed on display 25 as shown in block 962. The cardholder is then prompted to enter the code into the system by the prompts shown in boxes 988 and 990.

If the cardholder realizes that an incorrect code was entered in response to the prompt displayed in box 990, he may correct the error by depressing the NO key. The code will be deleted and the prompts to enter the code, shown in blocks 988 and 990, will be again displayed giving the cardholder another opportunity to enter the code. To verify that the cardholder has entered the correct code he depresses the YES key. The system then tests at step 992 whether the code is valid. Once the correct code is entered and verified to be valid, the account balance is updated and the new balance is displayed as indicated by box 994. If the code entered is not valid, the function is exited; and the system exits the function reflected by the display depicted at box 962.

Figure 18:
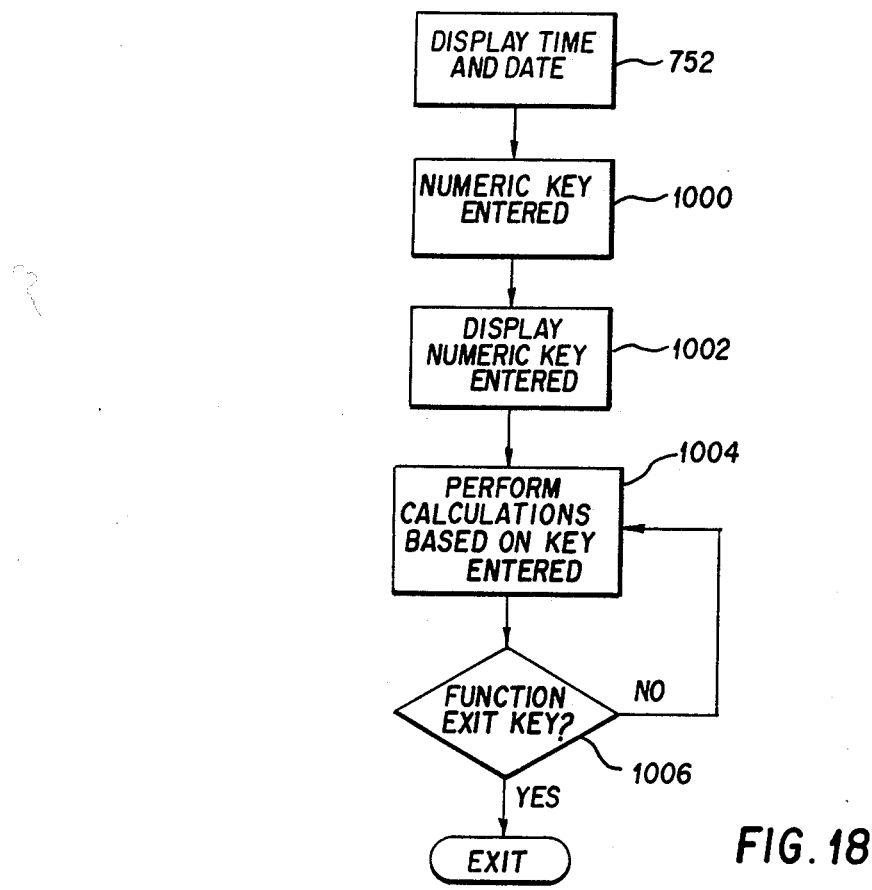
FIG. 18 is a flowchart for the calculator emulator application program.

Referring to FIG. 18, at step 1000 the calculator emulator application may be entered from the idle state shown by block 752 by depressing any numeric key. The numeric key depressed becomes the first digit of the number to be used in the calculation and is displayed at step 1002. The cardholder then uses the keypad as a calculator, where the NEXT key represents "+", the BACK key represents "−", the NO key represents a decimal point and the YES key represents "=". The ITC will continue to emulate a calculator at step 1004 until a predetermined key which exits the function is depressed at step 1006. The system then exits the application function at step 1008 and returns to the system idle state reflected by block 752.

The ITC hardware of the present invention comprises a Central Processing Unit (CPU) having Random Access Memory (RAM), Read Only Memory (ROM), input/output ports, keyboard, display, and power supply contained in a housing of similar dimensions as conventional transaction cards.

The CPU, which controls the system and processes the information, comprises a microprocessor preferably a TI 7000 style microcomputer manufactured by Texas Instruments. The RAM contained within the CPU is used for the temporary storage of the program data.

The ROM stores the code for the application software as well as general system software and security information. The ROM is preferably an EEPROM, which permits the information to be erased and reprogrammed electrically and without having to physically access the ROM chip. Thus, for example, out-of-date application software may be removed or the cardholder's PIN may be changed. The information is arranged and structured such that certain information is not accessible without authorization. For example, the security algorithms stored in ROM may be accessible only by the manufacturer of the card who knows the security program access code. The PIN may be changed only by the cardholder since the cardholder is the only one permitted to access the area of ROM where the PIN is stored.

The keyboard provides the cardholder a means to use and communicate with the ITC, for example, to access information stored on the card, to store information in the card, and to use and interact with the card application programs. In addition to a set of alphanumeric keys, at least one programmable function key is provided. The functionality of the programmable key is adaptable to the application. Preferably, program control keys identified by "YES", "NO", "NEXT" and "BACK" are also provided.

The display provides a visual output of information such as message prompts, error messages, transaction information, and the like to lead the cardholder through the proper sequence of steps to operate the card for different applications. The display may have the capability to display one or more lines of information at one time. If a multiple line message is to be displayed, the message may be flashed one or two lines at a time in sequence, each line of the message being displayed sufficiently long for the ITC cardholder to read the message. Alternatively, each line of a multiple line message may be displayed until the ITC cardholder depresses a key to tell the system to display the next line of the message.

Figure 19:
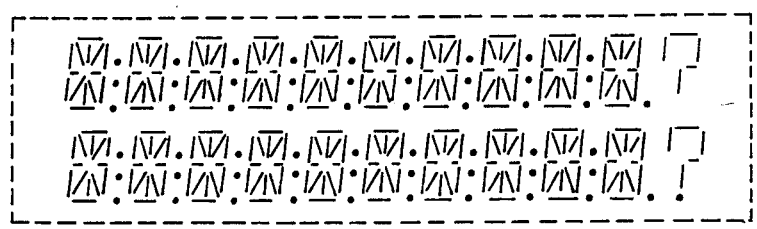
FIG. 19 illustrates a preferred embodiment of the display of the transaction card of the present invention.

The user-friendliness of the card is greatly enhanced by a custom-made liquid crystal display, a preferred embodiment of which is depicted in FIG. 19. FIG. 19 illustrates a two line display, each line having the capability to display 10 characters plus a separately segmented question mark. Each character in the display consists of 14 segments providing for a clear and unambiguous display of the entire alphabet plus numerics. Further, a provision is made for a colon and a decimal point between the characters to allow for the display of time as well decimal units of currency.

The power supply provides the necessary energy to operate the ITC. Preferably the power supply is a battery. The card may also be provided with a solar based power supply and a means for connecting to an external power source to supplement or substitute for the battery. Alternatively the solar based power supply may act solely as a switch to supply the power necessary to turn the ITC on. Once the ITC is turned on, the battery or external power source supplies the power to operate the ITC.

Figure 20:
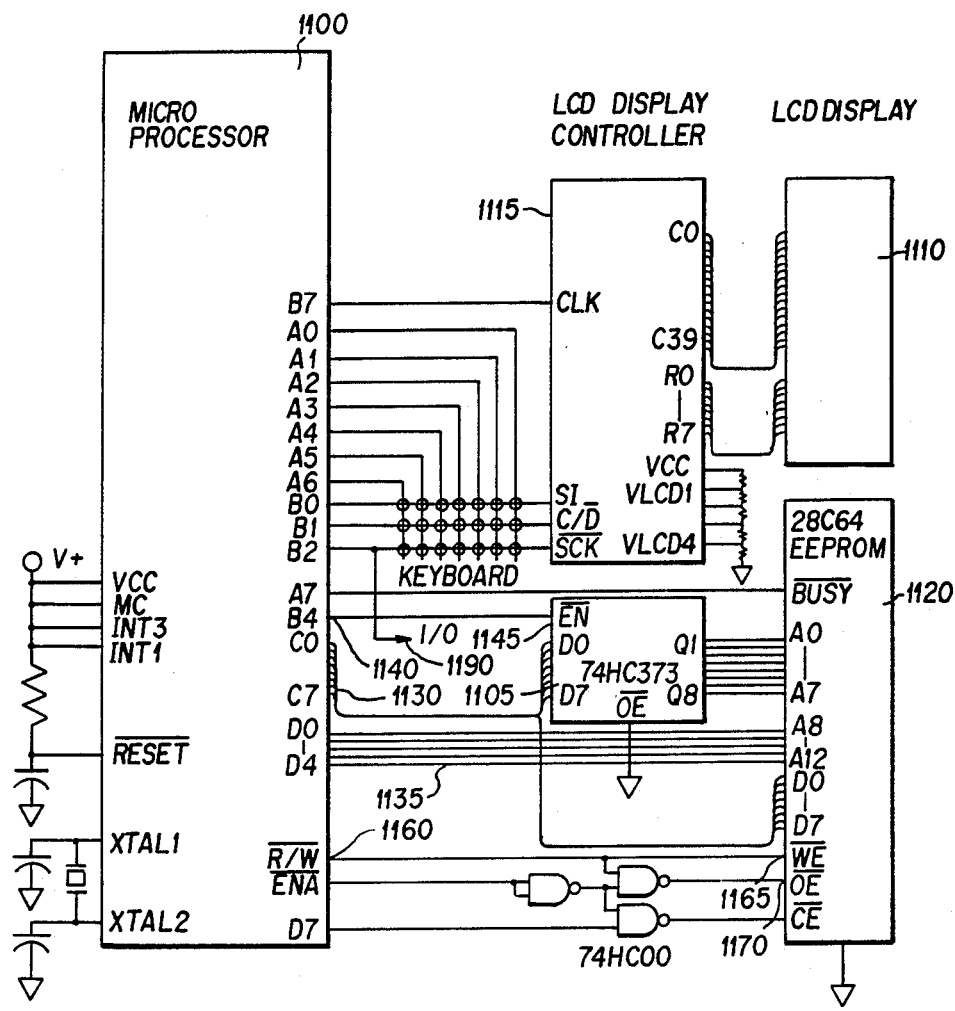
FIG. 20 is a schematic of one embodiment of the transaction card of the present invention.

More particularly, with reference to FIG. 20, the circuitry of the present invention comprises a CPU 1100, a latch 1105, an LCD display 1110, a display controller 1115 and an EEPROM 1120. CPU 1100 interfaces with the memory and I/O devices through an eight bit address/data bus 1130 (C0-7) and address bus 1135 (D0-7). Address/data bus 1130 is a bidirectional bus. The low order address byte is multiplexed with data input/output. Address bus 1135 provides the high order address byte.

Any address transmitted on address/data bus 1130 is first buffered (temporarily stored) in latch 1105. The latch 1105 acts as a buffer between the address/data bus 1130 and the memory device 1120.

A variety of control signals are used during the operation of this system. For example, CPU output port pin $B_4$ 1140 generates the latch enable signal (LATCH ENABLE) which is connected to chip enable pin 1145 of latch 1105. The R/W output port pin 1160 on the CPU controls whether the memory operation is a read or a write operation. The R/W control line is connected to the output enable pin OE 1170 and write enable pin WE on the ROM. Thus when a read operation is to be executed a logic value of "1" is output on the R/W control line for a read cycle. A write cycle is indicated by outputting a logic value of "0" on the R/W line.

I/O ports A and B on CPU 1100 provide the control signals for the display controller 1115. They also provide the signals for scanning the x-lines of the keyboard and the ports for reading the signals on the y-lines of the keyboard.

Input/output contacts 30 of the ITC may be optical or electrical. Illustratively one such contact is shown in FIG. 20 as serial input/output port 1190. This port may be connected to any compatible serial device such as a printer or off-line storage device. In the alternative as described below in connection with FIGS. 22–24 an inductive input/output port may be included which emulates the magnetic strip presently found on transaction cards. By emulating a magnetic strip, information may be communicated between the ITC and present day transaction card equipment such as magnetic card readers used in ATMs and point of sale (POS) terminals. The inductive port can also be used in place of an electrical or optical port for connection to a device such as a magnetic card reader.

The segmented liquid crystal display (LCD) is controlled by the LCD controller/driver circuit comprising a 4 bit display mode register (DMO-3), a 320 bit (40×8) display data memory, a timing controller, multiplexers, LCD driver-voltage controller, and row and column drivers. Although a segmented LCD driver and display are described, a dot matrix, bit-mapped display and controller may be used.

The display mode register and display data memory are implemented in RAM on CPU 1100. The display mode register (DMR) is an 8 bit read/write register although only 4 bits are presently in use. The display mode register designates the basic LCD clock frequency that multiplexes the data to the display. The LCD clock frequency is a subdivision of the crystal input frequency and therefore the frame frequency (the frequency at which the display information is presented). The DMR also enables/disables a LCD bias voltage resistor ladder as well as row/column display outputs.

The data display memory is implemented in RAM. The display row/column location and corresponding segment identification are stored in a RAM buffer. This information is accessed by the display controller 1115 for enabling the display 1110. If the display is a dot matrix display, one bit in RAM directly maps to a pixel identified by a row/column location on the display. Therefore, a bit in RAM having a value of "1" turns on the corresponding pixel on the display.

Figure 21:
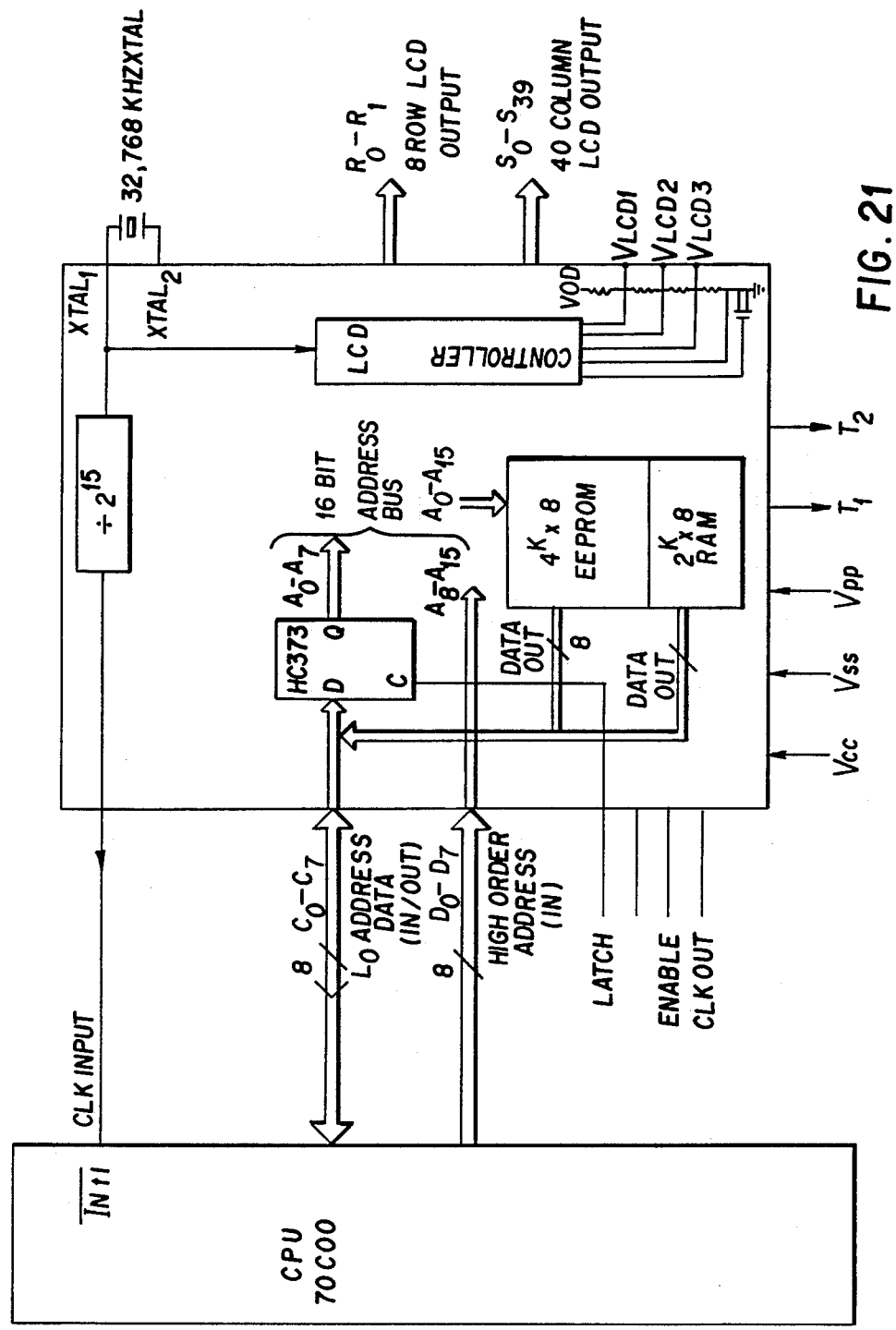
FIG. 21 is a schematic of the CPU and custom integrated circuit used in another embodiment of the present invention.

In order to increase the chip function density (i.e. the functionality per unit area), a custom-designed chip incorporating RAM, ROM, clock and LCD controller may replace the individual components as illustrated in FIG. 21. The same control and addressing mechanism as described above bit in RAM directly maps to a pixel identified by a row/column location on the display. Therefore, a bit in RAM having a value of "1" turns on the corresponding pixel on the display.

In order to increase the chip function density (i.e. the functionality per unit area), a custom-designed chip incorporating RAM, ROM, clock and LCD controller may replace the individual components as illustrated in FIG. 21. The same control and addressing mechanism as described above would be utilized, however an internal address/data bus would be provided for addressing the RAM and ROM implemented on the chip.

It may be desirable to communicate information stored or calculated in the ITC card to a terminal of a transaction card system. For example, if PIN verification is successfully executed on the ITC, the proper transaction code may be sent by the ITC to the terminal to acknowledge the verification. However, on many of the existing transaction terminals, the communication medium is a magnetic strip containing encoded information. Therefore, in another embodiment of the present invention shown in FIGS. 22A and 22B the ITC is provided with a magnetic head 1200 embedded in the card that can receive and transmit magnetically encoded information.

Figure 22A:
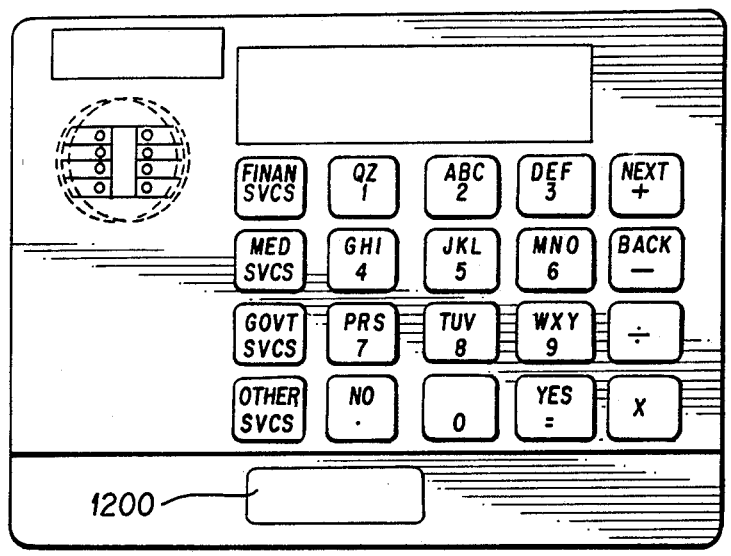
FIG. 22A and 22B illustrates the location of the magnetic card interface in the transaction card of the present invention.
Figure 22B:
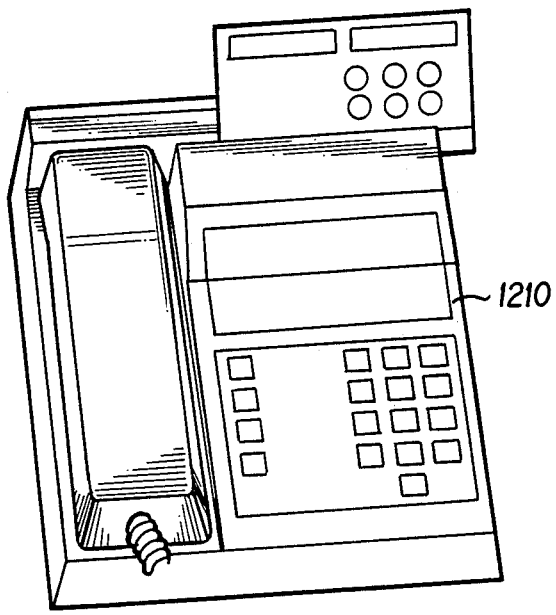
Figure 23:
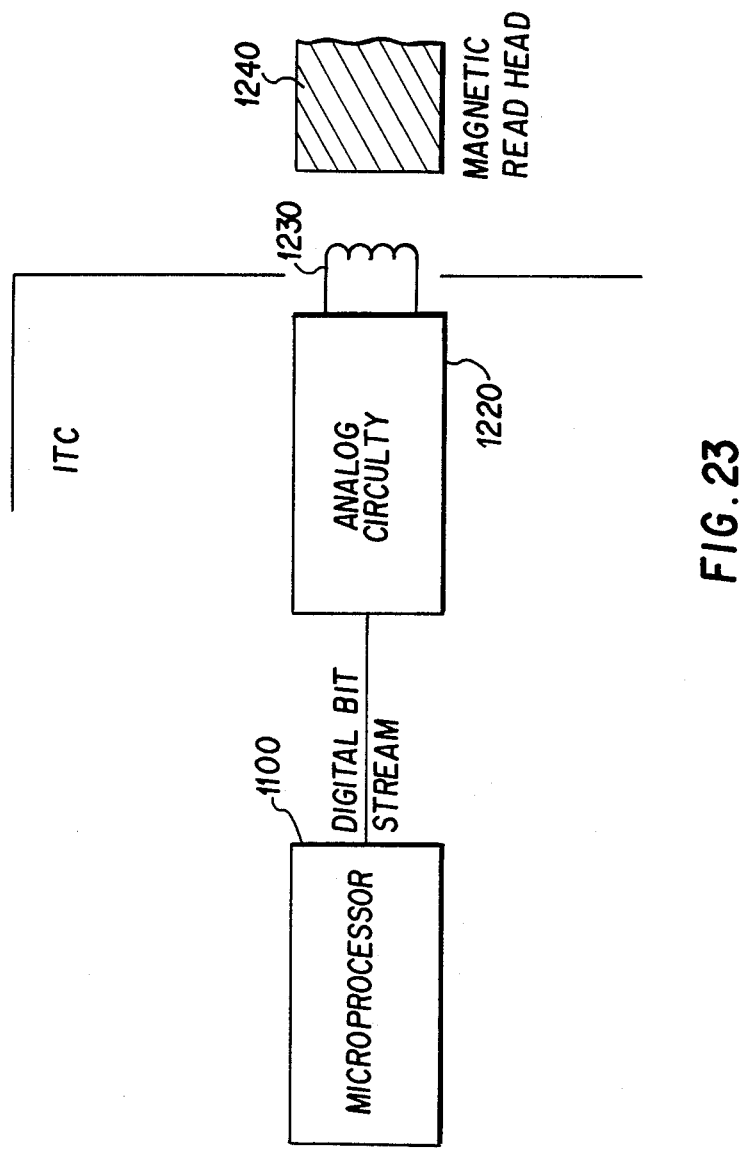
FIG. 23 illustrates the configuration of the ITC to the terminal interface.

Transducer 1200 is positioned within the card, as illustrated in FIG. 22A, such that the transducer can be aligned with the head in a card reading device such as a point of sale (POS) terminal 1210 as illustrated in FIG. 22B. Signals representing the data to be communicated are output serially, emulating the data encoded on a magnetic strip. The circuitry acts to simulate a magnetic field pattern that would exist on the magnetic strip of a credit card. Referring to FIG. 23, the data is output serially bit by bit from microprocessor 1100 to analog circuitry 1220 which drives an inductor 1230 that generates a magnetic field pattern which can be read and interpreted by a conventional magnetic read head 1240 in card reading device 1210.

Figure 24:
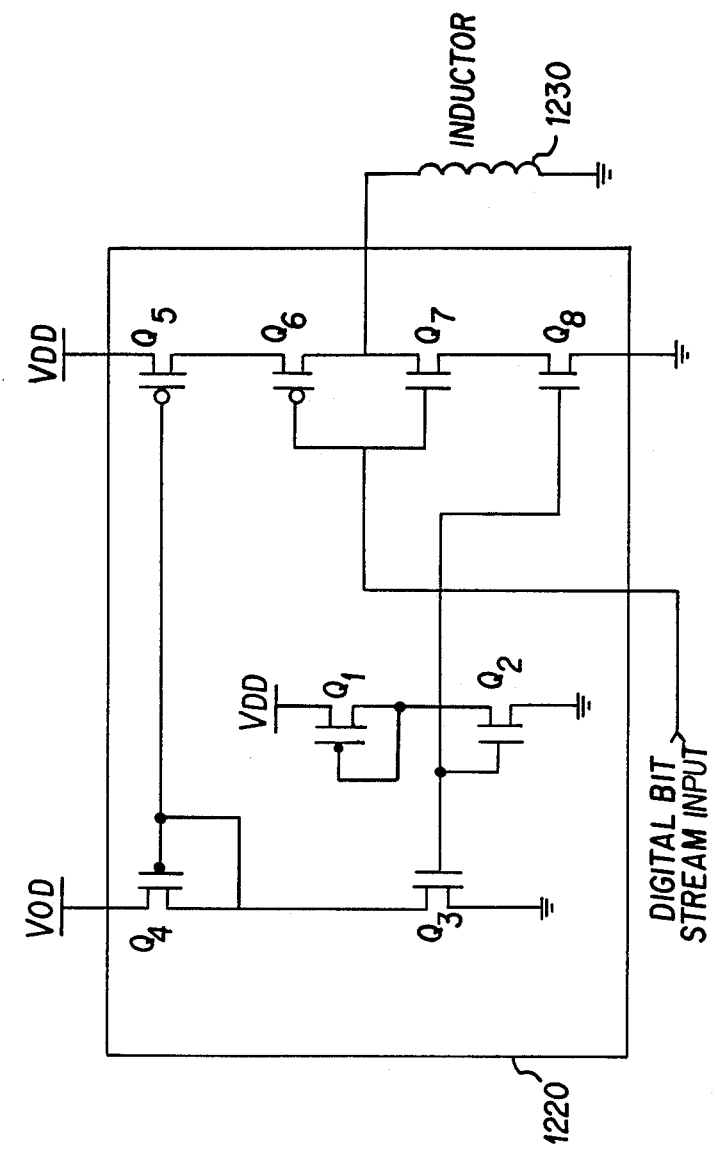
FIG. 24 illustrates the circuitry in the ITC terminal interface.

Preferably a simple digital-to-analog converter may be used as analog circuitry 1220, such as the CMOS read circuitry illustrated at FIG. 24. In this CMOS circuit, transistors $Q_1$, and $Q_2$ are biased to form a current source. The gate voltage of $Q_2$ is replicated at $Q_3$ which in combination with $Q_4$ form a current inverter. Further, since the gate of $Q_4$ is also connected to the gate of $Q_5$, the drain current of $Q_3$-$Q_4$ is mirrored into $Q_5$'s drain current. Similarly, as the gate of $Q_2$ is also tied to the gate of $Q_8$, the $Q_1$-$Q_2$ drain current is mirrored into the drain current of $Q_8$. Thus, $Q_5$ and $Q_8$ act as current sources of opposite polarity biased by the $Q_1$-$Q_2$ combination. $Q_5$ contributes the sourcing current for the load while $Q_8$ contributes the sinking current for the load. Transistors $Q_6$ and $Q_7$ are digital switches controlled by the microprocessor. When a logic '0' is imposed on the gates of $Q_6$-$Q_7$, $Q_6$ is on and $Q_7$ is off. Hence, $Q_5$ drives the inductor with a positive current through $Q_6$. When a logic '1' is imposed on the gates L of $Q_6$-$Q_7$, $Q_6$ is off and $Q_7$ is on. At this point, current is supplied to the inductive load. In this fashion, magnetic fields can be generated in the inductor of opposite polarity under software program control. These fields can then be read by a magnetic stripe card reader.

Figure 25:
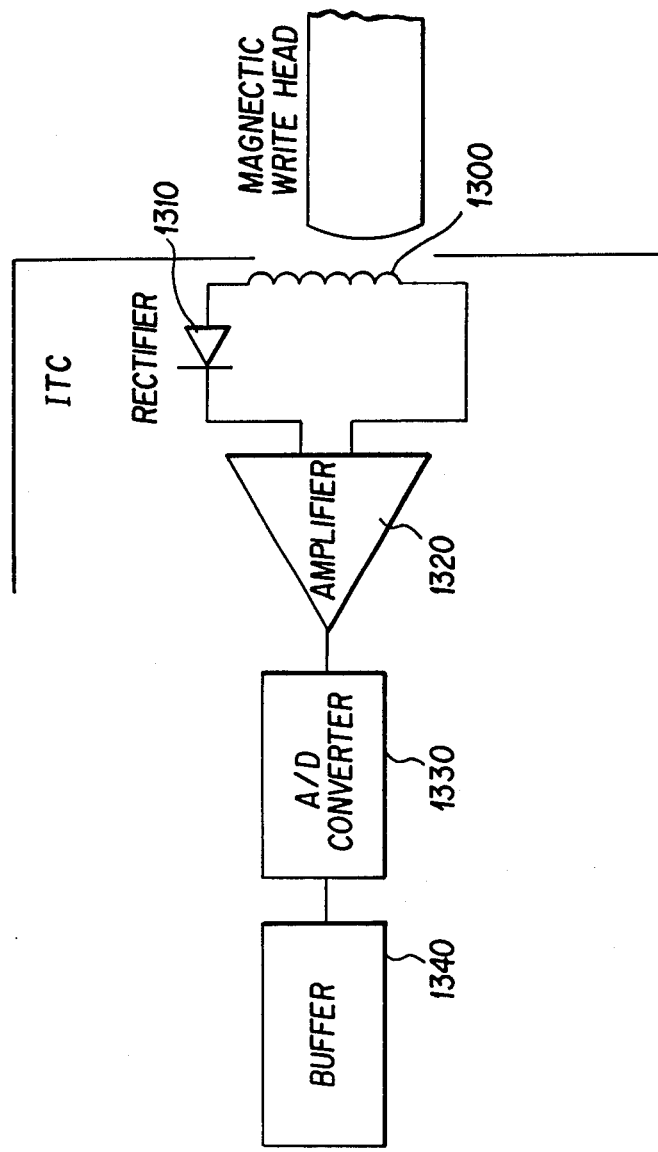
FIG. 25 illustrates a circuitry to read into ITC information transmitted by a magnetic card writing device.

Similarly, it may be desirable to read into the ITC information transmitted by a magnetic card writing device. Referring to the block diagram of FIG. 25, such circuitry comprises a micro inductor 1300 to read the magnetic field pattern generated by the magnetic write head of the transmitting device, a rectifier 1310, a amplifier 1320, an A/D converter 1330 and a buffer 1340. The signal is rectified, amplified, converted to an analog-to-digital signal and stored in a buffer for subsequent access and use.

While the invention has been described in conjunction with the preferred embodiment, it is evident that numerous alternatives, modifications, variations and uses will be apparent to those skilled in the art in light of the foregoing description.

As explained above in conjunction with FIG. 16, ITC cards may be readily programmed for use as credit cards. The cards may also be programmed to be used in the transportation industry, for example, to simplify the system of purchasing train tickets and replace subway tokens and special passes for the students or the elderly. The cards may also be used for government sponsored programs such as the Food Stamp or Medicaid programs to replace current identification and recording procedures. The cards may also be programmed and installed by manufacturers of trucks, cars, and buses for anti-theft protection, performance monitoring and warranty administration. ITC cards may be used to secure access to personal and large computers, computer software, homes, apartments, offices, hotel rooms, data networks, military/government/commercial confidential zones, and services available over the phone line, such as mobile phones, videotex services, databases and pay television. The card may also be used as an all purpose access and recording instrument for the delivery of goods and services in a hotel or resort environment. Instead of signing a voucher, the type and amount of the service is entered into the ITC card for storage and subsequent retrieval.

The ITC card may also be used in the banking field to store account balances, receipts of banking transactions and the like. Presently, transaction cards having a magnetic strip encoded thereon are used to access automatic teller machines (ATM). To access an ATM the cardholder inserts his card into a slot where account information is read off the magnetic strip on the card. The cardholder then enters into the ATM his personal identification number (PIN). The cardholder's PIN and account information is checked and verified before permitting the cardholder access to the ATM. PIN verification may instead be performed on the ITC card.

The cardholder would enter the PIN into the card. Once the PIN is verified the card transmits a special code to the ATM for access to the system. PIN verification as well as credit balance verification may also be done on the ITC independent of a bank terminal. In such circumstances, the ITC verifies that sufficient credit exists for a transaction and then generates an approval code for the merchant to receive the transaction. The use of the ITC card provides an additional layer of security against fraudulent access not found in other systems. In addition, the PIN may be changed, at any time, by the cardholder without having to change any cardholder information within the ATM system itself.

The ITC may also operate independently, sometimes referred to as in "stand alone" mode. Thus applications, for example, credit verification and the like, may be done without the need of a terminal device such as an ATM or point of sale (POS) terminal.

An ITC card may be used to store medical information such as the cardholder's complete medical history or medical insurance coverage. The cards may also be used in the education field for the storage and retrieval of school records, activities, class scheduling.

Numerous other applications will be evident in view of the foregoing description.

What is claimed is:

1. An intelligent transaction card comprising:
   a transaction card-shaped housing;
   a means contained within the housing to provide power to operate the card;
   a keypad located on a surface of the housing for entry of information by a user;
   a display located on a surface of the housing for the presentation of information;
   a microprocessor contained within the housing;
   at least one port in said housing connected to the microprocessor for the input and output of information;
   a microprocessor memory contained within the housing and connected to said microprocessor; and
   an operating system program stored in the memory and controlling operation of the card through the microprocessor, comprising:
   a means for generating a plurality of messages on the display that prompt the user during the operation of the card to select from a plurality of application programs which reside in the microprocessor memory;
   means for switching control of the microprocessor form the operating system program to a selected application program; and
   means for modifying at least one program stored in said memory.

2. The intelligent transaction card of claim 1 wherein the keypad is multifunctional and programmable.

3. The intelligent transaction card of claim 1 wherein the means to provide power is a connection in the housing to an external power supply.

4. The intelligent transaction card of claim 1 wherein the means to provide power is an electromagnetic energy receiver mounted in said housing.

5. The intelligent transaction card of claim 1 wherein the means to provide power is a solar cell mounted in said housing.

6. The intelligent transaction card of claim 1 wherein a solar cell acts as a switch to turn the intelligent transaction card on and off.

7. The intelligent transaction card of claim 1 wherein the port is an optical input/output port.

8. The intelligent transaction card of claim 1 wherein the port is an electrical input/output port.

9. The intelligent transaction card of claim 1 further comprising circuitry to receive and transmit magnetically encoded information to an external device.

10. The intelligent transaction card of claim 1 wherein said operating system comprises:
    a plurality of modules operable while in an idle state to monitor the keypad, the ports and to update the date and time; and
    a plurality of service routines to control the display, the ports the keyboard, the memory and the application programs.

11. The intelligent transaction card of claim 1 further comprising at least one undefined programmable function key that may be defined for a specific purpose according to the application.

12. The intelligent transaction card of claim 1 wherein the keypad further comprises application control keys which control the selection and execution of the application programs in the intelligent transaction card.

13. The intelligent transaction card of claim 1 wherein the application control keys are labeled "YES", "NO", "NEXT" and "BACK".

14. The intelligent transaction card of claim 1 wherein the microprocessor memory is an EEPROM.

15. The intelligent transaction card of claim 1 further comprising circuitry to receive and transmit magnetically encoded information to an external device.

16. The intelligent transaction card of claim 1 wherein said means for modifying further comprises:
    means for loading a variety of different application programs into the memory from at least one port.

17. The intelligent transaction card of claim 16 wherein said means for loading comprises:
    means for locating at least one unused portion of said memory for the storage of an application to be loaded; and
    means for relocating address references of said application program based on an absolute address at which said program is loaded.

18. The intelligent transaction card of claim 17 wherein said means for relocating comprises:
    means for temporarily storing a table of relative address references of said application programs;
    means for determining a starting address of said memory at which the beginning of said application program is to be loaded; and
    means for adding the starting address to each relative address reference of the application program.

19. The intelligent transaction card of claim 18 further comprising a means of maintaining in said memory a list of the starting addresses of all application programs stored in said memory, including a means for updating said list upon the loading of a new application program.

20. The intelligent transaction card of claim 17 wherein said operating system further comprises a memory security means for preventing an application program from accessing certain records in memory.

21. The intelligent transaction card of claim 20 wherein said memory security means comprises a means for associating with each record of memory, an authorization number corresponding to an authorized user.

22. The transaction card of claim 21 wherein said operating system further comprises a means for entering into memory a personal identification number of a user and wherein said memory security means prevents an application program form accessing a record in memory if said personal identification number does not correspond to said authorization number.

23. The intelligent transaction card of claim 1 wherein said operating system further comprises a programming security means for preventing unauthorized changes in the programs stored in the card's memory.

24. The intelligent transaction card of claim 23 wherein said programming security means prevents the cardholder from altering said programs while allowing the supplier of the program to enter modifications.

25. The intelligent transaction card of claim 24 wherein said programming security means comprises computer instructions stored in the card's memory which can only be accessed by a person who provides the card with a security program access code.

26. The intelligent transaction card of claim 1 wherein said memory comprises a system data area comprising variable length records; each record comprising an application number field, a data size field and a PIN field.

27. The intelligent transaction card of claim 26 further comprising a record locating means for locating a next record by incrementing a memory pointer containing an address of a current record by a quantity stored in said data size field of said current record.

28. The intelligent transaction card of claim 27 wherein said record locating means operates to locate a desired record by reading said application number field and said PIN field of a current record and comparing said fields against desired application and PIN numbers respectively, and for repeating said comparison with each said next record until a match is found.

29. The intelligent transaction card of claim 1 wherein said microprocessor memory comprises:
a system data area for storing said operating system,
an application data area for storing program code of said application program, and
a transaction data area for storing data used by said application programs.

30. The intelligent transaction card of claim 1 wherein said operating system program is written in modular fashion to allow dynamic reconfiguration of said modules by said modifying means.

31. The intelligent transaction card of claim 1 further comprising a means on the card for encrypting information.

32. An intelligent transaction card comprising:
a transaction card-shaped housing;
a means contained within the housing to provide power to operate the card;
a keypad located on a surface of the housing for entry of information by a user;
a display located on the surface of the housing for the presentation of information;
a microprocessor contained within the housing to control the operation of the card;
at least one port in said housing connected to the microprocessor for the input and output of information;
a microprocessor memory contained within the housing and connected to said microprocessor;
an opening system stored in the memory and controlling the operation of the card through the microprocessor to allow a user to select from a plurality of application programs which reside in the microprocessor memory; and
means for switching control of the microprocessor from the operating system to a selected application program;
means for storing in said memory a personal identification number (PIN) known to a user of said card;
means accessible to said user for changing the PIN stored in said memory;
a credit/purchase application program stored in the memory and executed by the microprocessor through the operating system, said credit/purchase application comprising:
means for storing a credit balance;
means for receiving through the keypad the user's PIN and amount of a transaction;
means for verifying that the PIN received through the keypad is equal to a PIN stored in the memory;
means for verifying that a sufficient credit balance exists to execute the transaction; and
means for generating an approval code to be displayed on the display if sufficient credit balance exists and the PIN received through the keypad is equal to the PIN stored in memory;
whereby the card verifies the user's credit balance for a purchase and generates an approval code for the purchase independent of any external terminal device.

33. The intelligent transaction card of claim 32 further comprising means accessible to the user for varying an algorithm used for generating said approval code.

* * * * *

UNITED STATES PATENT AND TRADEMARK OFFICE
CERTIFICATE OF CORRECTION

PATENT NO. : 4,868,376
DATED : September 19, 1989
INVENTOR(S) : Arien Lessin, Frank M. Gruppuso and Shelley A. Harrison It is certified that error appears in the above-indentified patent and that said Letters Patent is hereby corrected as shown below:

Column 21, line 51, delete the word "form" and replace with ---from---.

Signed and Sealed this

Twenty-fourth Day of October, 1995

Attest:

BRUCE LEHMAN

Attesting Officer   Commissioner of Patents and Trademarks